(12) United States Patent
Guo et al.

(10) Patent No.: US 6,762,769 B2
(45) Date of Patent: Jul. 13, 2004

(54) SYSTEM AND METHOD FOR REAL-TIME TEXTURE SYNTHESIS USING PATCH-BASED SAMPLING

(75) Inventors: Baining Guo, Beijing (CN); Lin Liang, Beijing (CN); Heung-Yeung Shum, Redmond, WA (US); Ying-Qing Xu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 105 days.

(21) Appl. No.: 10/056,791

(22) Filed: Jan. 23, 2002

(65) Prior Publication Data

US 2003/0164838 A1 Sep. 4, 2003

(51) Int. Cl.[7] ................................................. G09G 5/00
(52) U.S. Cl. ...................... 345/582; 345/583; 345/584; 345/587; 345/588; 382/284
(58) Field of Search ................................ 345/582, 583, 345/584, 587, 588; 382/284

(56) References Cited

U.S. PATENT DOCUMENTS

| | | | | |
|---|---|---|---|---|
| 5,325,480 A | * | 6/1994 | Rice | 345/474 |
| 5,572,636 A | * | 11/1996 | Sakuraba et al. | 345/586 |
| 5,801,708 A | * | 9/1998 | Alcorn et al. | 345/587 |
| 5,847,712 A | * | 12/1998 | Salesin et al. | 345/582 |
| 5,872,867 A | * | 2/1999 | Bergen | 382/254 |
| 5,949,425 A | * | 9/1999 | Willis | 345/428 |
| 6,002,407 A | * | 12/1999 | Fadden | 345/582 |
| 6,075,905 A | * | 6/2000 | Herman et al. | 382/284 |
| 6,084,595 A | * | 7/2000 | Bach et al. | 345/589 |
| 6,266,064 B1 | * | 7/2001 | Snyder | 345/421 |
| 6,268,866 B1 | * | 7/2001 | Shibata | 358/3.28 |
| 6,356,272 B1 | * | 3/2002 | Matsumoto et al. | 345/582 |
| 6,448,973 B1 | * | 9/2002 | Guo et al. | 345/582 |
| 6,556,210 B1 | * | 4/2003 | Yamamoto et al. | 345/582 |
| 6,593,933 B1 | * | 7/2003 | Xu et al. | 345/586 |
| 2002/0122043 A1 | * | 9/2002 | Freeman et al. | 345/582 |

OTHER PUBLICATIONS

M. Ashikhmin. Synthesizing Natural Textures. In *Proc. of ACM Symposium on Interactive 3D Graphics*, pp. 217–226, Mar. 2001.
A. A. Efros and T. K. Leung. Texture Synthesis by Non–Parametric Sampling. In *Proceedings of International Conference on Computer Vision*, 1999.
L. Y. Wei and M. Levoy. Fast Texture Synthesis Using Tree–Structured Vector Quantization. In *Computer Graphics Proceedings, Annual Conference Series*, pp. 479–488, Jul. 2000.
Y. Q. Xu, B. Guo, and H. Y. Shum. Chaos Mosaic: Fast and Memory Efficient Texture Synthesis. In *Microsoft Research Technical Report MSR–TR–2000–32*, Apr. 2000.

* cited by examiner

Primary Examiner—Matthew C. Bella
Assistant Examiner—Po-Wei Chen
(74) Attorney, Agent, or Firm—Lyon & Harr, LLP; Mark A. Watson

(57) ABSTRACT

The present invention involves a new system and method for synthesizing textures from an input sample. A system and method according to the present invention uses a unique accelerated patch-based sampling system to synthesize high-quality textures in real-time using a small input texture sample. The patch-based sampling system of the present invention works well for a wide variety of textures ranging from regular to stochastic. Potential feature mismatches across patch boundaries are avoided by sampling patches according to a non-parametric estimation of the local conditional Markov Random Field (MRF) density function.

36 Claims, 15 Drawing Sheets

(9 of 15 Drawing Sheet(s) Filed in Color)

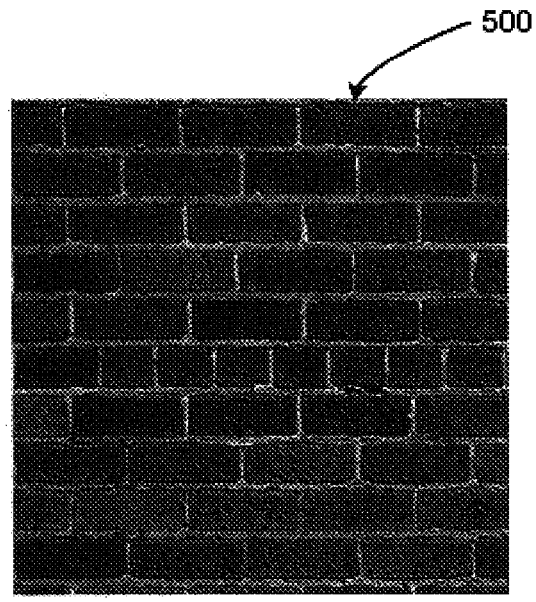
FIG. 5A
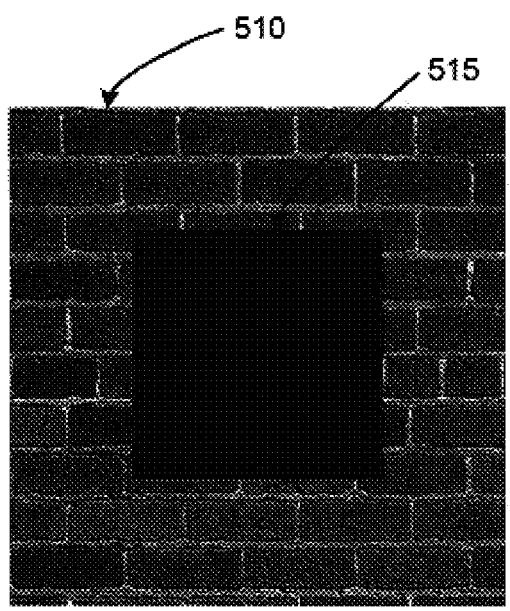 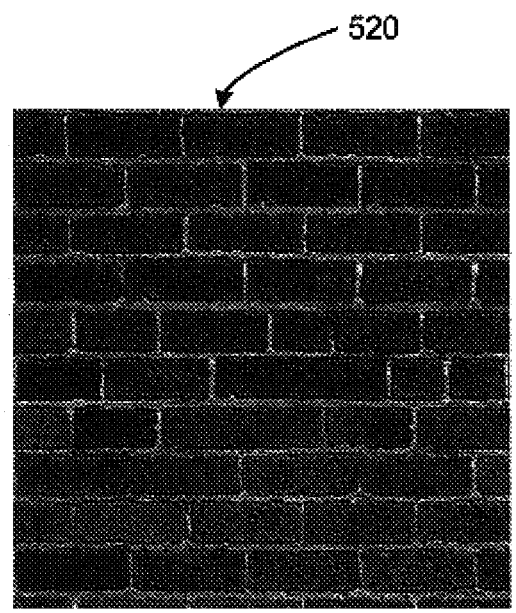
FIG. 5B	FIG. 5C $\varepsilon = 0$ $\varepsilon = 0.2$ $\varepsilon = 1.0$

SYSTEM AND METHOD FOR REAL-TIME TEXTURE SYNTHESIS USING PATCH-BASED SAMPLING

BACKGROUND

1. Technical Field

The invention is related to a system for efficiently synthesizing textures from an input sample, and in particular, to a system and method for real-time synthesis of high-quality textures using a patch-based sampling system designed to avoid potential feature mismatches across patch boundaries.

2. Related Art

Texture synthesis has a variety of applications in computer vision, graphics, and image processing. An important motivation for texture synthesis comes from texture mapping. Texture images usually come from scanned photographs, and the available photographs may be too small to cover the entire object surface. In this situation, a simple tiling will introduce unacceptable artifacts in the forms of visible repetition and seams. Texture synthesis solves this problem by generating textures of the desired sizes. Other applications of texture synthesis include various image processing tasks such as occlusion fill-in and image/video compression. Simply stated, the texture synthesis problem may be described as follows: Given an input sample texture, synthesize an output texture that is sufficiently different from the input sample texture, yet appears perceptually to be generated by the same underlying stochastic process.

For example, one conventional scheme uses a texture synthesis approach that, although based on a Markov Random Field (MRF) model of a given input texture, avoids explicit probability function construction and consequent sampling from it. This is accomplished by generating the output image pixel by pixel in scanline order, choosing at each step a pixel from the sample image which neighborhood is most similar with respect to a specified measure to the currently available neighborhood in the texture being synthesized. However, this scheme suffers from several problems, including a relatively slow processing speed for generating textures, and a tendency to blur out finer details and well-defined edges for some textures. Further, this scheme also tends to run into problems in cases where the texture to be synthesized consists of an arrangement of relatively small objects such as leaves, flowers, pebbles, etc.

A related scheme expands on the aforementioned scheme by providing for verbatim copying and use of small pieces, or "patches" of the input sample, rather than use of individual pixels, for synthesizing the output texture. Patches are sampled from a local probability density function (PDF) using a non-parametric sampling algorithm that works well for a wide variety of textures ranging from regular to stochastic. Visual masking is used to hide the seams between the patches. However, while faster than the aforementioned scheme, this scheme is also too slow to be useful for generation of textures in real-time. Further, this scheme also suffers from a problem whereby noticeable visual artifacts can be created in the output texture. Further, depending upon the input texture, in certain cases this scheme produces output textures the bear little resemblance to the input texture and thus have little or no photo-realism.

Another conventional scheme provides a special purpose texture synthesis algorithm that is well suited for a specific class of naturally occurring textures. This class includes quasi-repeating patterns consisting of small objects of familiar but irregular size, such as flower fields, pebbles, forest undergrowth, bushes and tree branches. However, while this scheme performs fairly well with "natural textures"; it performs poorly for other textures, such as textures that are relatively smooth or have more or less regular structures such as, for example, clouds, or brick walls. In addition, this scheme is also too slow to be useful for real-time synthesis of textures.

Some of the aforementioned problems with synthesis of various texture types have been addressed by another conventional scheme that uses patch-based sampling to generate textures from an input sample. In particular, this scheme works well on stochastic textures such as, for example, a sample texture input comprising a group of small pebbles. However, where the sample texture has a more or less regular structure, such as a brick wall, or a tire tread, this patch pasting algorithm fails to produce good results because of mismatched features across patch boundaries.

Therefore, what is needed is a system and method for reliably synthesizing realistic textures for a given input sample. Such texture synthesis should be capable of generating textures for a variety of input texture types ranging from regular to stochastic. Further, such a system and method should be capable of generating textures quickly enough so as to operate in real-time.

SUMMARY

The present invention involves a new system and method which solves the aforementioned problems, as well as other problems that will become apparent from an understanding of the following description by providing a novel approach for synthesizing textures from an input sample using patch-based sampling. A patch-based sampling system and method according to the present invention operates to synthesize high-quality textures in real-time using a relatively small input texture sample. The patch-based sampling system of the present invention works well for a wide variety of textures ranging from regular to stochastic. Further, potential feature mismatches across patch boundaries are avoided by sampling patches according to a non-parametric estimation of the local conditional Markov Random Field (MRF) density function.

The system and method of the present invention is applicable to both constrained and unconstrained texture synthesis using either regular or stochastic input textures. Examples of constrained texture synthesis include hole filling, and tileable texture synthesis. In addition, in one embodiment, as described herein, the patch-based sampling system and method of the present invention includes an intuitive randomness parameter that allows an end user to interactively control a perceived randomness of the synthesized texture.

Conventional texture synthesis schemes typically fall into one of two categories. First, one class of texture synthesis schemes compute global statistics in feature space and sample images from a texture ensemble directly. A second approach involves estimating a local conditional probability density function (PDF), then synthesizing pixels incrementally to produce an output image. The texture synthesis system and method provided by the present invention follows the second approach. Specifically, the present invention includes estimation of a local conditional PDF rather than computing global statistics in feature space and sampling images from a texture ensemble directly.

In accordance with the present invention, a Markov Random Field (MRF) is used as a texture model, and it is assumed that the underlying stochastic process is both local and stationary. The MRF is preferred because it is known by those skilled in the art to accurately model a wide range of textures. However, other more specialized conventional models, including, for example, reaction-diffusion, frequency domain, and fractals, may also be used in alternate embodiments of a system and method according to the present invention.

Note that for purposes of clarity and ease of explanation, the texture patches described herein are described as square in shape. However, it should be appreciated by those skilled in the art that any shape of texture patch, such as, for example, a rectangle, triangle, circle, oval, or any other geometric shape may be used in accordance with the system and method described herein.

Texture synthesis, according to the present invention, includes the following elements: First, the size of the texture patches that will be used for texture synthesis is determined. This determination is made either manually, or it is made automatically using conventional texture analysis techniques. Typically, as is well known to those skilled in the art, the optimum size of the texture patches is a function of the size of texture elements within the input image. However, it should be noted that, in general, as the size of the texture patch decreases, the apparent randomness of the synthesized texture increases. Similarly, as the size of the texture patch is increased, the apparent randomness of the synthesized texture will decrease.

Next, a starting patch, which is simply a randomly chosen texture patch from the input image sample, is pasted into one corner of an output image that will form the synthesized texture. A set of texture patches is then formed from the input image sample such that a "boundary zone" of predetermined width along the edge of each texture patch in the set matches a corresponding, overlapping, boundary zone of the randomly chosen starting patch within an adjustable "distance." The "distance" between boundary zones is determined as a function of the similarity between the image elements comprising corresponding overlapping boundary zones. Smaller distances indicate closer matches. Any of a number of conventional distance metrics may be used for measuring similarity between boundary zones.

If no image patches having a distance less than a predetermined maximum distance can be found for the set of texture patches, then the set of texture patches will be empty, and a texture patch having the closest boundary zone match is pasted adjacent to the previously pasted patch, with the corresponding boundary zones of each texture patch overlapping. However, if the set of texture patches is not empty, then a texture patch is randomly selected from the set of texture patches. This randomly selected texture patch is then pasted adjacent to the previously pasted texture patch, again, with the corresponding boundary zones of each patch overlapping.

Once the texture patch has been pasted, the newly pasted patch is then used as the basis for creating a new set of texture patches having matching boundary zones, as described above. Again, if the set is empty, a randomly selected patch is then pasted adjacent to the previously pasted patch, with boundary zones again overlapping, as described above. If the set is not empty, a patch is randomly chosen from the set and pasted adjacent to the previously pasted patch, with boundary zones again overlapping, as described above.

The steps described above are repeated, with the patch pasting proceeding in scan-line type fashion, beginning in one corner of the synthesized image, and proceeding on a row-by-row basis until the synthesized texture has been completely filled with texture patches. Further, with respect to the overlapping boundary zones between patches, conventional blending operations are preformed to smooth, feather, or average the observed transition between pasted texture patches. It should be noted that this blending may be performed either after each individual pasting operation, or, in an alternate embodiment, after all pasting operations have been completed.

Additionally, it should be noted that while, in one embodiment, the texture synthesis by patch pasting proceeds in a scan-line type fashion, as described above, other pasting orders are also useful in certain circumstances. For example, with respect to occlusion filling, more realistic results are achieved by spiral pasting of patches within the occlusion, beginning from the outside edge of the occlusion, and then working around the edge and into the center of the occlusion until the occlusion is filled. In another embodiment, patch pasting proceeds in a scan-line type order, but on a column-by-column basis, rather than on a row-by-row basis.

Further, it should also be noted that each particular patch might need to match several boundary zones. For example, as a second row of patch pasting is begun, when using a scan-line type patch pasting order, boundary zones of patches in the second row, beginning with the second patch in the second row, will need to match both the boundary zones of the patch pasted immediately prior to the current patch, as well as the corresponding boundary zone of the patch in the prior row. Further, when pasting patches in a spiral order, as with occlusion filling, or where it is desired to synthesize a tileable texture, particular patch boundary zones will need to match anywhere from one to four corresponding boundary zones, assuming a square patch. The number of boundary zones required to be matched is a simple function of how many adjacent patch boundary zones the pasted texture patch must match, and therefore simply depends upon where the patch is being pasted within the synthesized image. Consequently, when generating the set from which patches are randomly selected for each patch pasting operation, the distance to each corresponding boundary zone must be determined to ensure that particular texture patches will match all surrounding texture patches that have already been pasted into the output image forming the synthesized texture.

As noted above, a set of matching texture patches is generated for each pasting operation. Real-time texture synthesis is, in part, achieved by use of an acceleration system for searching and choosing patches to be pasted from the initial input image. In general, the core computation in the patch-based sampling of the present invention can be formulated as a search for approximate nearest neighbors (ANN) to identify potentially matching texture patches. This search is accelerated to provide real-time texture synthesis by combining an optimized technique for a general ANN search with a novel data structure called the "quad-tree pyramid" for ANN search of images and principal component analysis of the input sample texture.

In general, real-time texture synthesis is achieved by acceleration of an ANN search for texture patches to fill the set from which patches are randomly selected. ANN searches are much faster, but less exact than brute force searching methods. However, conventional ANN searches are still too slow to allow for real-time texture synthesis using an average personal computer or the like. It is possible to accelerate an ANN search to provide for faster selection of matching texture patches. However, it is important to avoid acceleration techniques that will introduce noticeable artifacts in synthesized textures. With this principle in mind, the ANN search used by the present invention is accelerated at three levels that avoid the introduction of noticeable artifacts into the synthesized texture. Each of these three acceleration levels is used either individually, or in combination in alternate embodiments of the present invention.

In particular, a first level of acceleration of the ANN search is achieved using an optimized kd-tree. For patch-based sampling, this optimized kd-tree performs as well as a conventional bd-tree, which itself is optimal for ANN searching, but which introduces more artifacts into the synthesized texture than does the optimized kd-tree. Next, a second level of acceleration is introduced which utilizes the aforementioned quad-tree pyramid (QTP) to accelerate the ANN search by making use of the fact that the data points in the ANN search space are images. Finally, a conventional principal components analysis (PCA) is used to accelerate the search for texture patches within the given input sample texture. As noted above, each of the individual levels of acceleration can be combined to produce a compounded acceleration of the ANN search.

In general, the QTP accelerates the ANN search by providing the capability to perform hierarchical searches of image data to identify texture patches for populating the patch sets. As noted above, individual texture patches are then randomly chosen from these sets for each pasting operation. In general, the QTP provides a multilevel pyramid representation of the input image which the texture synthesis is to be based on. Unlike a conventional Gaussian pyramid, every set of four pixels in each lower level has a corresponding pixel in the next higher level. Note that each successively higher level of the QTP represents a successively lower resolution than each previous level. Successive levels of the QTP are generated by filtering the input image to generate successively lower resolution copies of the input image, with each lower resolution copy of the input image being comprised of successively lower resolution data points, e.g., image pixels.

The QTP operates to accelerate ANN searches by finding approximate nearest neighbors (ANN's) for a query vector v. First, m initial candidates, i.e., m potential texture patch matches, are identified using the low resolution data points (image pixels) and the query vector v. In general, an m much smaller than n is chosen, with n representing the number of data points. In a working example of the present invention, an m=40 was used. Increasing m tends to increase the total number of nearest neighbors eventually identified, but it also serves to increase the time necessary for conducting searches. From the initial candidates, the k nearest neighbors are identified using the high-resolution query vector v along with the data points.

In order to accelerate the search of the m initial candidates, the input sample texture is simply filtered, such as, for example, by downsampling the image, into one or more successively lower resolution copies of the input image. A tree pyramid is then built using the successively lower resolution images. The tree node in the QTP is a pointer to an image patch and each tree level corresponds to a level in the pyramid, with the root of the tree being the initial input sample texture. When moving from one level of pyramid to the next lower resolution level, four children (lower resolution images) are computed, with different shifts along the x- and y-axis (all four directions) for each child to ensure that each pixel or patch in a given child corresponds to a patch in the next lower level (higher resolution) child of the input image. As noted above, this shift ensures that, unlike a conventional Gaussian pyramid, each pixel in a given child has four corresponding pixels in the next higher resolution image, e.g., the filtered image on the next lower level of the pyramid.

Initial candidates are selected by first comparing filtered image patches at the highest level of the QTP to a filtered copy of the previously pasted texture patch. Potential matches are then followed down through the tree to identify potential texture patch matches to the previously pasted texture patch. In particular, the k ANN texture patches are identified by following the pyramid down to the root of the QTP and computing the distance of potential texture patch matches to see if they actually match the previously pasted texture patch or patches. Consequently, the total number of potential searches is dramatically reduced with each successively higher level of the QTP. This dramatic reduction in the number of potential searches serves to drastically reduce the time necessary to identify texture patch matches for pasting into the synthesized texture, thereby facilitating real-time texture synthesis.

It should be noted, that in the extreme, as the number of levels of the QTP are increased, the reduced resolution of the higher levels will cause more and more potential texture patch matches to be missed. In a working example of the present invention, it was found that a three level QTP produced very good results while drastically reducing search time for identifying texture patch matches for pasting into the synthesized texture in comparison to other conventional patch-based texture synthesis schemes.

In addition to the just described benefits, other advantages of the present invention will become apparent from the detailed description which follows hereinafter when taken in conjunction with the accompanying drawing figures.

DESCRIPTION OF THE DRAWINGS

The patent or application file contains at least one drawing executed in color. Copies of this patent or patent application publication with color drawing(s) will be provided by the Office upon request and payment of the necessary fee. The specific features, aspects, and advantages of the present invention will become better understood with regard to the following description, appended claims, and accompanying drawings where:

FIG. 5A illustrates an exemplary input image texture.

FIG. 5B illustrates the exemplary input image texture of FIG. 5A showing an occlusion in the center of the image.

FIG. 5C illustrates an output texture synthesized by spiral pasting of texture patches to fill the occlusion of FIG. 5B in accordance with the present invention.

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
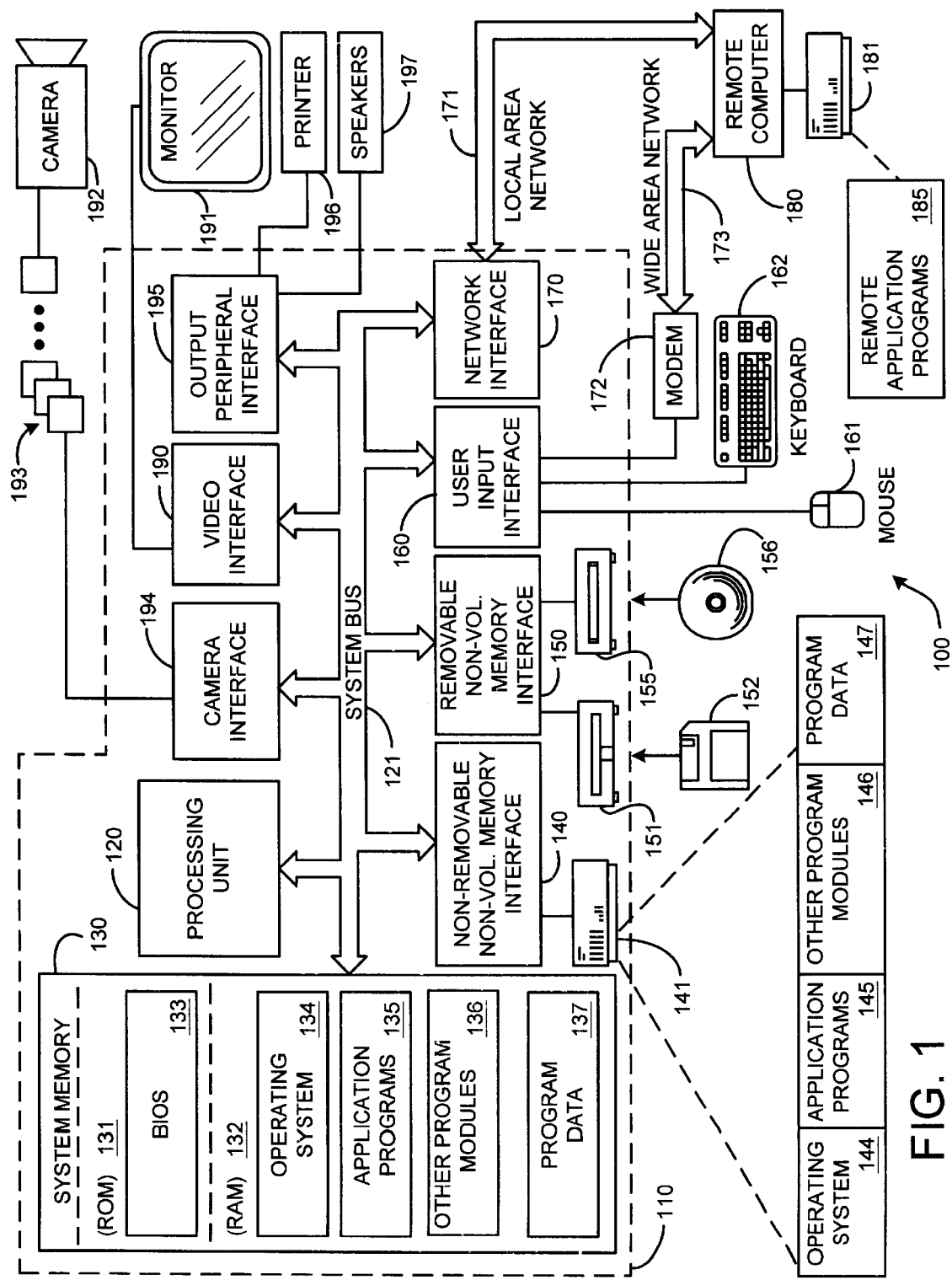
FIG. 1 is a general system diagram depicting a general-purpose computing device constituting an exemplary system for implementing the present invention.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying the present invention.

2.0 Introduction:

A patch-based sampling system and method according to the present invention is useful for synthesizing both constrained and unconstrained textures in real-time using a relatively small input texture sample. Examples of constrained texture synthesis include hole filling (occlusions) and tileable texture synthesis. Unconstrained texture synthesis involves merely synthesizing a texture of any desired size without dealing with occlusion or tileability of the synthesized texture. The patch-based sampling system of the present invention works well for a wide variety of textures ranging from regular (i.e., a brick wall) to stochastic (i.e., a random field of pebbles or rocks). Potential feature mismatches across patch boundaries are avoided by sampling patches according to a non-parametric estimation of the local conditional Markov Random Field (MRF) density function. Further, in one embodiment, as described below, overlapping regions of sampled patches used to synthesize an output texture are blended using conventional techniques to reduce potential discontinuities across patch boundaries.

2.1 System Overview:

Conventional texture synthesis schemes typically fall into one of two categories. First, one class of texture synthesis schemes compute global statistics in feature space and sample images from a texture ensemble directly. A second approach involves estimating a local conditional probability density function (PDF), then synthesizing pixels incrementally to produce an output image. The texture synthesis system and method provided by the present invention follows the second approach. Specifically, the present invention includes estimation of a local conditional PDF rather than computing global statistics in feature space and sampling images from a texture ensemble directly.

In accordance with the present invention, a Markov Random Field (MRF) is used as a texture model, and it is assumed that the underlying stochastic process is both local and stationary. The MRF is preferred because it is known by those skilled in the art to accurately model a wide range of textures. However, other more specialized conventional models, including, for example, reaction-diffusion, frequency domain, and fractals, may also be used in alternate embodiments of a system and method according to the present invention.

Note that for purposes of clarity and ease of explanation, the texture patches described herein are described as square in shape. However, it should be appreciated by those skilled in the art that any shape of texture patch, such as, for example, a rectangle, triangle, circle, oval, or any other geometric shape may be used in accordance with the system and method described herein.

In general, a system and method according to the present invention operates to synthesize a texture by first determining the size of texture patches that will be used for texture synthesis. This determination is made either manually, or it is made automatically using conventional texture analysis techniques. Typically, as is well known to those skilled in the art, the optimum size of the texture patches is a function of the size of texture elements within the input image. However, it should be noted that, in general, as the size of the texture patch decreases, the apparent randomness of the synthesized texture increases. Similarly, as the size of the texture patch is increased, the apparent randomness of the synthesized texture will decrease.

Next, a starting patch, which is simply a randomly chosen texture patch from the input image sample, is pasted into one corner of an output image that will form the synthesized texture. A set of texture patches is then formed from the input image sample such that a "boundary zone" of predetermined width along the edge of each texture patch in the set matches a corresponding, overlapping, boundary zone of the randomly chosen starting patch within an adjustable "distance." The "distance" between boundary zones is determined as a function of the similarity between the image elements comprising corresponding overlapping boundary zones. Smaller distances indicate closer matches. Any of a number of conventional distance metrics may be used for measuring similarity between boundary zones.

Note that in conventional patch pasting schemes, selection of potential texture patches for pasting is a time consuming process which typically make such schemes unsuitable for real-time texture synthesis. This problem is solved, in part, through use of a system for accelerating the search for potential texture patches with which to fill the aforementioned set of texture patches. This acceleration system, termed a "quad-tree pyramid" (QTP), is useful for rapidly locating approximate nearest neighbors (ANN), i.e., matching texture patches, in the input image texture. The QTP, which is described in detail below in Section 4.2, makes use of a pyramid structure comprised of one or more levels of deceasing resolution of the input image texture to significantly reduce the time required to identify matching texture patches with which to populate the aforementioned texture patch set.

If no image patches having a distance less than a predetermined maximum distance can be found for the set of texture patches, then the set of texture patches will be empty, and a texture patch having the closest boundary zone match is pasted adjacent to the previously pasted patch, with the corresponding boundary zones of each texture patch overlapping. However, if the set of texture patches is not empty, then a texture patch is randomly selected from the set of texture patches. This randomly selected texture patch is then pasted adjacent to the previously pasted texture patch, again, with the corresponding boundary zones of each patch overlapping.

Once the texture patch has been pasted, the newly pasted patch is then used as the basis for creating a new set of texture patches having matching boundary zones, as described above. Again, if the set is empty, a randomly selected patch is then pasted adjacent to the previously pasted patch, with boundary zones again overlapping, as described above. If the set is not empty, a patch is randomly chosen from the set and pasted adjacent to the previously pasted patch, with boundary zones again overlapping, as described above.

The steps described above are repeated, with the patch pasting proceeding in scan-line type fashion, beginning in one corner of the synthesized image, and proceeding on a row-by-row basis until the synthesized texture has been completely filled with texture patches. Further, with respect to the overlapping boundary zones between patches, conventional blending operations are preformed to smooth, feather, or average the observed transition between pasted texture patches. It should be noted that this blending may be performed either after each individual pasting operation, or, in an alternate embodiment, after all pasting operations have been completed.

Additionally, it should be noted that while, in one embodiment, the texture synthesis by patch pasting proceeds in a scan-line type fashion, as described above, other pasting orders are also useful in certain circumstances. For example, with respect to occlusion filling, more realistic results are achieved by spiral pasting of patches within the occlusion, beginning from the outside edge of the occlusion, and then working around the edge and into the center of the occlusion until the occlusion is filled. In another embodiment, patch pasting proceeds in a scan-line type order, but on a column-by-column basis, rather than on a row-by-row basis.

Further, it should also be noted that each particular patch might need to match several boundary zones. For example, as a second row of patch pasting is begun, when using a scan-line type patch pasting order, boundary zones of patches in the second row, beginning with the second patch in the second row, will need to match both the boundary zones of the patch pasted immediately prior to the current patch, as well as the corresponding boundary zone of the patch in the prior row. Further, when pasting patches in a spiral order, as with occlusion filling, or where it is desired to synthesize a tileable texture, particular patch boundary zones will need to match anywhere from one to four corresponding boundary zones, assuming a square patch. The number of boundary zones required to be matched is a simple function of how many adjacent patch boundary zones the pasted texture patch must match, and therefore simply depends upon where the patch is being pasted within the synthesized image. Consequently, when generating the set from which patches are randomly selected for each patch pasting operation, the distance to each corresponding boundary zone must be determined to ensure that particular texture patches will match all surrounding texture patches that have already been pasted into the output image forming the synthesized texture.

Figure 2:
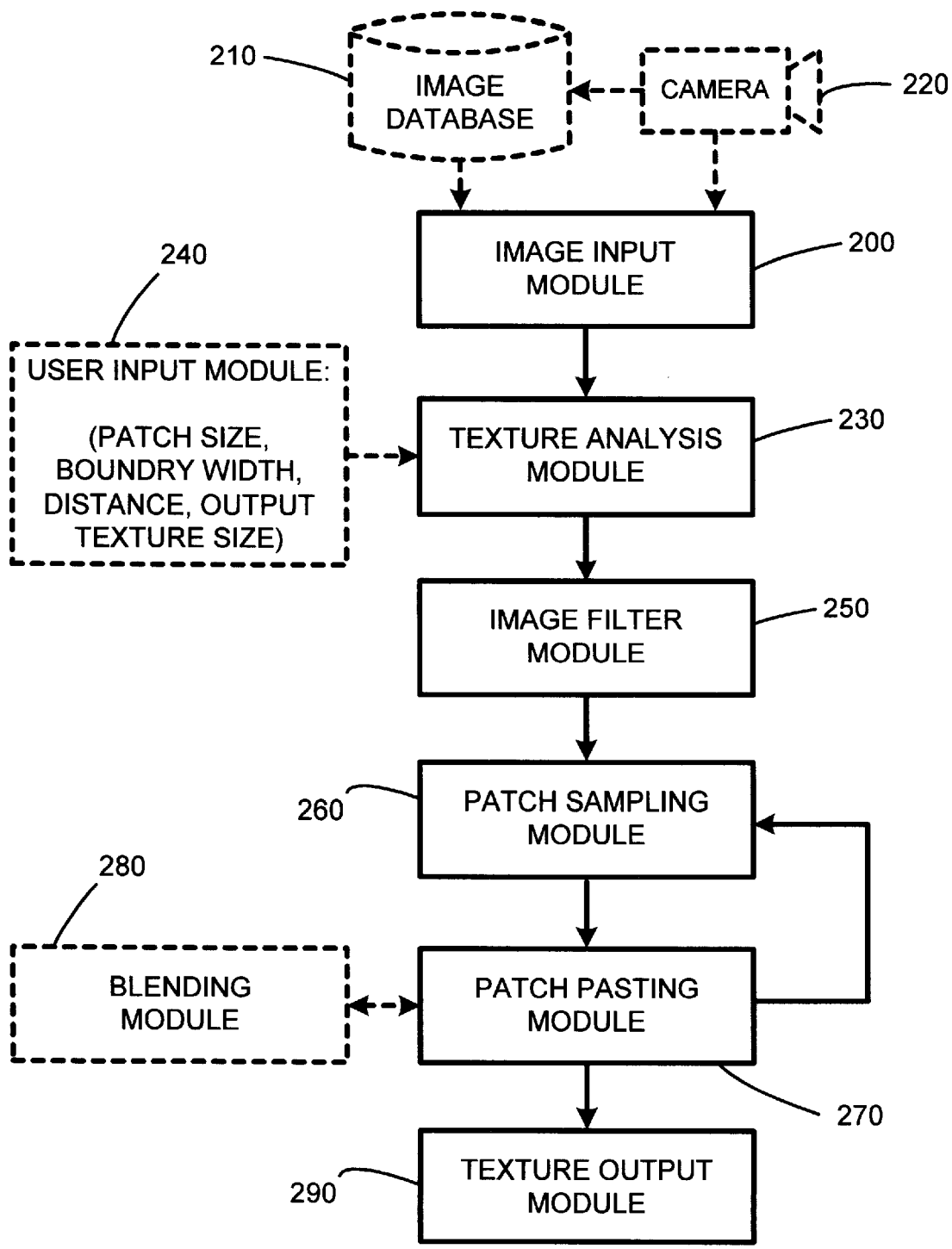
FIG. 2 illustrates an exemplary architectural diagram showing exemplary program modules for implementing the present invention.

The process summarized above is illustrated by the general system diagram of FIG. 2. In particular, the system diagram of FIG. 2 illustrates the interrelationships between program modules for implementing real-time texture synthesis using patch-based sampling in accordance with the present invention. It should be noted that the boxes and interconnections between boxes that are represented by broken or dashed lines in FIG. 2 represent alternate embodiments of the present invention, and that any or all of these alternate embodiments, as described below, may be used in combination with other alternate embodiments that are described throughout this document.

In particular, as illustrated by FIG. 2, a system and method in accordance with the present invention uses an image input module 200 to input an image or texture which is to be sampled for the purpose of synthesizing a new texture. In one embodiment, the image input module 200 retrieves the input image texture from a database or directory 210 containing at least one image texture. Alternately, in another embodiment, the image input module 200 reads an input image texture directly from a digital camera 220 using conventional techniques.

Once the input image texture has been retrieved by the image input module 200, it is provided to a texture analysis module 230. The texture analysis module 230 then uses conventional texture analysis techniques to determine an approximate scale of texture elements within the input image texture. The determination of approximate texture scale within the input image texture allows an appropriate patch size to be selected for synthesis of the output image. In general, as the patch size increases, the output image becomes less random, and resembles the input image in greater detail. Conversely, as the patch size decreases, the texture patches will contain less structural information about the input image texture, and the output image will thus appear more random. In addition to determining a proper patch size, the texture analysis module 230 also makes a determination as to an appropriate patch boundary zone width, and a maximum desirable distance between overlapping pasted patch boundary zones. Note that the concepts of patch size, patch boundary zone width, and maximum distance between matching patch boundary zones are discussed in greater detail below in Section 3.0.

In a related embodiment, the parameters defining patch size, patch boundary zone width and maximum distance between matching patch boundary zones, are user definable via a user input module 240. This embodiment provides the user with flexibility and control over the appearance of the final output texture. In addition, the user input module 240 also provides the user with the capability to specify a size for the synthesized output image texture.

Further, in another embodiment, the texture analysis module 230 uses conventional techniques to automatically identify areas within the input image texture which are blocked or occluded. Once identified, occluded areas may be filled in the output image texture, as described below. Further, blocked or occluded areas within the input image texture are not sampled to provide texture patches for pasting into the output image texture. In a related embodiment, the user input module 240 uses conventional techniques to provide the user with the capability to manually specify areas within the input image texture which are blocked or occluded. The concepts involved in filling occluded areas within an image are discussed in greater detail below in Section 2.4.

Once the texture analysis module 230 has either determined or received the texture patch parameters described above, an image filter module 250 uses conventional techniques to filter the input image texture to provide one or more levels of deceasing resolution of the input image texture for building the aforementioned quad-tree pyramid (QTP). The QTP is then passed to a patch sampling module 260. The patch sampling module 260 then identifies and passes an initial randomly selected texture patch to a patch pasting module 270. The patch pasting module 270 then pastes this initial randomly selected texture patch into an output texture image.

Once the initial texture patch has been pasted into the output texture image, the patch sampling module uses the QTP to identify other texture patches having matching boundary zones with the previously pasted texture patch. These identified texture patches are then used to populate a set of matching texture patches. From this set of matching texture patches, one texture patch is chosen at random and passed to the patch pasting module 270. The patch pasting module 270 then pastes this randomly selected texture patch into the output texture image, with one or more boundary zones of this texture patch overlapping previously pasted texture patches, as described herein. Once this texture patch has been pasted, it is used as the basis for a new QTP search to identify other texture patches having matching boundary zones. As before, the identified texture patches are used to populate a new set of matching texture patches from which a matching patch is again chosen at random for pasting into the output texture. These steps, i.e., patch pasting, QTP search, set population, random selection from the set, followed by patch pasting, are simply repeated until the output texture has been completely synthesized.

Note that as discussed above, if for any particular texture patch, the QTP search is unable to identify matching texture patches that fall within the minimum distance, a texture patch having the smallest distance is chosen and passed to the patch pasting module 270 in lieu of a texture patch from the texture patch set.

In another embodiment, as noted above, a blending module 280 uses conventional techniques to blend, feather, or average the overlapping boundary zones between pasted texture patches as the texture patches are pasted into the output texture. In a related embodiment, the blending module 280 blends, feathers, or averages the overlapping boundary zones between pasted texture patches only after all texture patches have been pasted into the output texture.

Once the patch pasting module 270 has completely synthesized the output texture, the synthesized output texture is passed to a texture output module 290. The texture output module 290 then either displays the synthesized output texture using conventional techniques or stores the synthesized texture for later use.

Figure 3A:
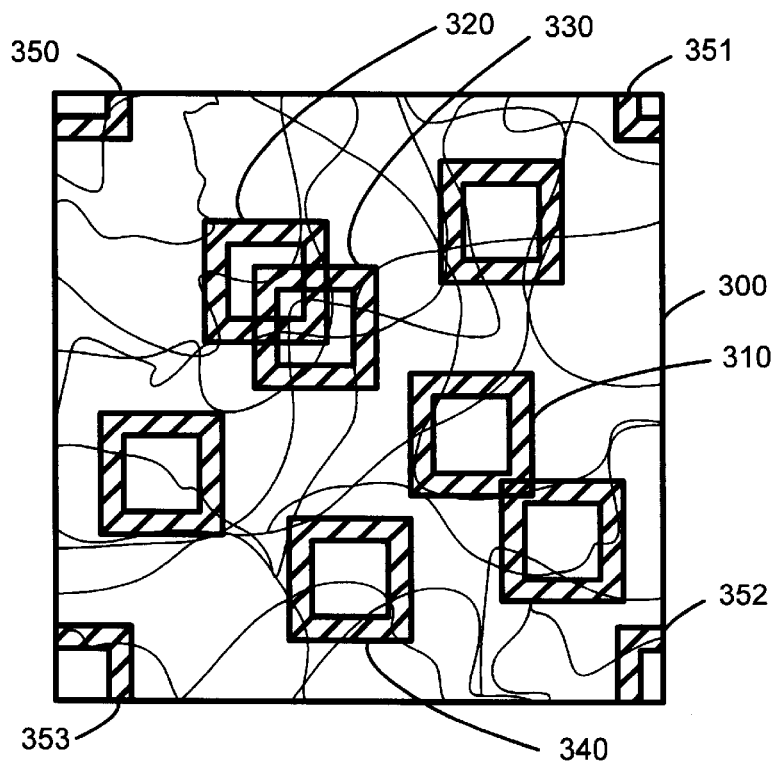
FIG. 3A illustrates sampling of texture patches from within an exemplary image input texture.

2.2 Texture Patch Sampling Strategy:

As illustrated in FIG. 3A, texture patches 310, 320, and 330 are sampled from completely within the boundaries of the input image texture 300. This rule avoids potential sampling of undefined areas from outside the boundaries of the input image texture 300 which could result in unpredictable or unacceptable texture synthesis results. However, in one embodiment, in the case where the input image texture 300 is tileable, then the texture patches are sampled both from within the input image as well as being sampled toroidally, 340 and 351 through 354 respectively. In other words, in the case where the input sample is tileable, sampled patches may extend across the boundaries of the input image and toroidally wrap to the opposite side of the input image. This concept is clearly illustrated in FIG. 3AB by texture patch 350, which wraps to each of the four corners of the input image texture 300, see, e.g., 350, 351, 352 and 353.

Figure 3B:
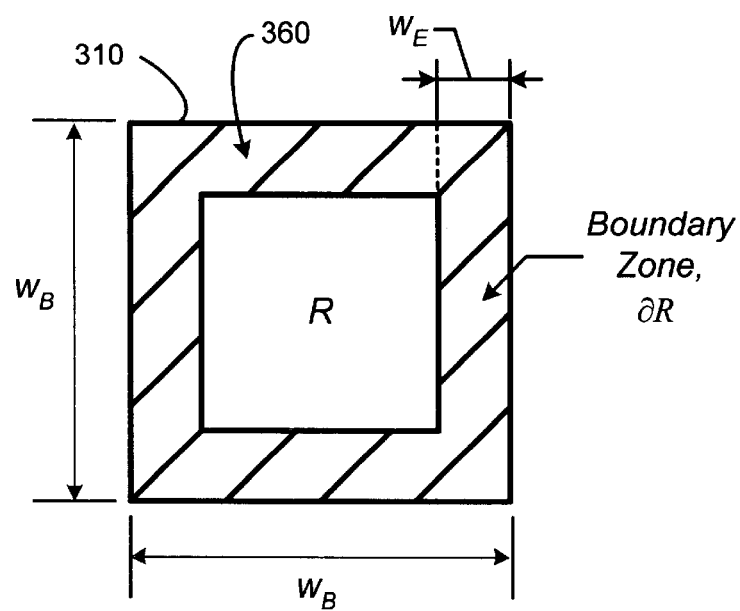
FIG. 3B illustrates an exemplary texture patch showing boundary zones.

In general, the patch-based sampling system and method of the present invention uses texture patches of an input sample texture, $I_{in}$, as the building blocks for constructing a synthesized texture $I_{out}$. In each step of the texture synthesis, a patch, $B_k$, of the input sample texture $I_{in}$ is pasted into the synthesized texture $I_{out}$, with a "boundary zone" of each pasted texture patch overlapping corresponding boundary zones of one or more previously pasted patches. To avoid mismatching features across patch boundaries, $B_k$ is carefully selected based on the patches already pasted in $I_{out}$, i.e., $\{B_0, \ldots B_{k-1},\}$. Further, each texture patch is preferably of a constrained, predetermined size. Consequently, as illustrated in FIG. 3B, in the case of square patches, each patch 210 has dimensions of $w_B \times w_B$, and a boundary zone 360 having a width $w_E$ (see hatched area of FIG. 3B).

As noted above, texture patches are sampled from the input sample texture, $I_{in}$. Where $I_{R1}$ and $I_{R2}$ represent two texture patches of the same size and shape sampled from the $I_{in}$, those texture patches, $I_{R1}$ and $I_{R2}$, are said to "match" if $d(R1, R2)<\delta$, where $d(\ )$ represents the "distance" between two the texture patches and $\delta$ is a prescribed constant. Assuming the Markov property, the patch-based sampling system and method of the present invention estimates the local conditional MRF density (either FRAME or Gibbs, as is well known to those skilled in the art), $p(I_R|I_{\partial R})$, in a non-parametric form using an empirical histogram for each texture patch, $I_R$, with respect to a "boundary zone," $\partial R$, for each texture patch. The boundary zone, $\partial R$, of the texture patch $I_R$ is defined as a band of width $w_E$ along the boundary of texture patch R as illustrated in FIG. 3B.

When the texture on the boundary zone $I_{\partial R}$ is known, e.g., such as by modeling the texture using the MRF, the conditional probability distribution of an unknown texture patch, $I_R$, is estimated. Instead of constructing a model, the input sample texture $I_{in}$ is directly searched for all patches having the known $I_R$ as their boundary zones. The results of the search form an empirical histogram, hereafter represented by the symbol $\Psi$, for the texture patch $I_R$. In other words, $\Psi$ represents the set from which texture patches are chosen for pasting as described herein. To synthesize $I_R$, an element from $\Psi$ is simply chosen at random. Mathematically, the estimated conditional MRF density is represented by Equation 1:

$$p(I_R|I_{\partial R}) = \sum_i \alpha_i \delta(I_R - I_{R^i}), \quad \sum_i \alpha_i = 1 \qquad \text{Equation 1}$$

where $I_R^i$ is a patch of the input sample texture $I_{in}$ whose boundary zone $I_{\partial R}^i$ matches the boundary zone $I_{\partial R}$ and $\delta(\ )$ is Dirac's delta. The weight, $a_i$, is a normalized similarity scale factor. With patch-based sampling, the statistical constraint is implicit in the boundary zone $\partial R$. Note that a large boundary zone implies a strong statistical constraint. In other words, as the size of the boundary zone becomes larger, it becomes statistically more difficult to match that boundary zone.

Figure 4A:
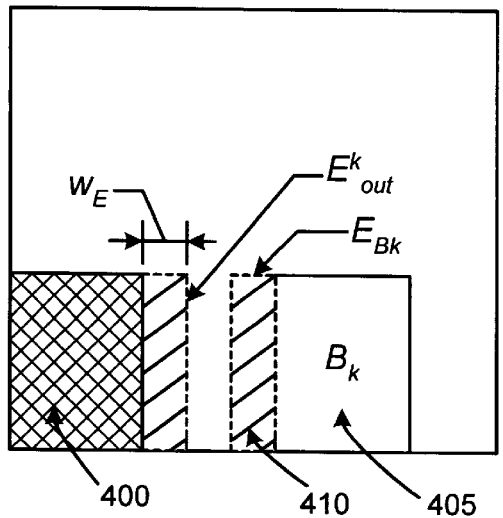
FIG. 4A illustrates sequential pasting of texture patches into an output texture in accordance with the present invention.
Figure 4B:
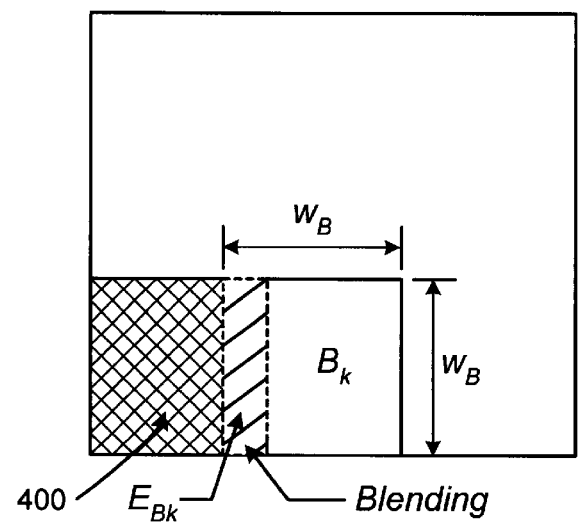
FIG. 4B illustrates sequential pasting of texture patches into the output texture of FIG. 4A.
Figure 4C:
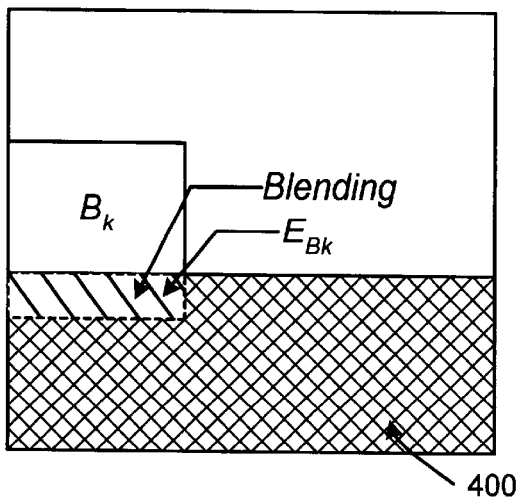
FIG. 4C illustrates sequential pasting of texture patches into the output texture of FIG. 4B.

2.3 Unconstrained Texture Synthesis:

In the simplest case, where the synthesized texture is neither tileable, nor involves occlusions or the like, texture synthesis for an output texture of a given size is said to be unconstrained. FIGS. 4A through 4D illustrate one example sequential of unconstrained texture synthesis. Specifically, with respect to such unconstrained texture synthesis, the patch-based sampling strategy described above is used to choose the texture patch $B_k$ 405, the $k^{th}$ texture patch to be pasted into the output texture $I_{out}$. As illustrated by FIG. 4A, only part of the boundary zone of $B_k$ 410 overlaps with the boundary zone of the already pasted patches $\{B_0, \ldots B_{k-1},\}$ in $I_{out}$. Two boundary zones are said to match if they match in their overlapping region. In FIG. 4A, $B_k$ has a boundary zone $E_{Bk}$ of width $w_E$. The already pasted patches in $I_{out}$ also have a boundary zone $E^k_{out}$ of width $w_E$. In accordance with the aforementioned patch-based sampling strategy, $E_{Bk}$ should match $E^k_{out}$. These concepts are illustrated by FIG. 4A through FIG. 4D.

In particular, as illustrated by FIG. 4A, the shaded region 400 shows the area of the output texture, $I_{out}$, which has already been synthesized by the pasting of one or more patches. Further, as illustrated by FIG. 4A through FIG. 4D, the boundary zones $E^k_{out}$ and $E_{Bk}$ preferably match, i.e., the distance between the boundary zones is less than a predetermined distance metric as described above. FIG. 4A through FIG. 4D show the progress of the texture synthesis as additional texture patches are pasted into the output texture, $I_{out}$, with the shaded area 400 showing the growing area of $I_{out}$ which has already been synthesized. Note that as discussed above, and as illustrated by FIG. 4D, the boundary zone 410 along more than one edge of the texture patch 405 may need to match the boundary zones of previously pasted texture patches, depending upon the position of the texture patch being pasted.

To provide randomness within the synthesized texture, $I_{out}$, a set, $\Psi_B$, is first formed. This set, $\Psi_B$, consists of all identified texture patches of $I_{in}$ whose overlapping boundary zones match $E^k_{out}$ within the predetermined distance metric. Assuming $B_{(x,y)}$ is the texture patch whose lower left corner is at (x,y) in $I_{in}$, Equation 2 illustrates the mathematical construction of $\Psi_B$:

$$\Psi_B = \{B_{(x,y)} | d(E_{B_{(x,y)}}, E_{out}^k) < d_{max}, B_{(x,y)} \text{ in } I_{in}\} \quad \text{Equation 2}$$

where $d_{max}$ is the distance tolerance of the overlapping boundary zones between texture patches. Computation of $d_{max}$ as a function $E_{out}^k$ is discussed in detail below in Section 3.0. A texture patch is then randomly chosen from $\Psi_B$ to be the $k^{th}$ patch to be pasted, as noted above. As discussed above, where $\Psi_B$ is an empty set, the texture patch $B_k$ having the smallest distance $d(E_{Bk}, E_{out}^k)$ is chosen from $I_{in}$ for pasting into $I_{out}$.

Texture synthesis then proceeds as discussed above by performing the following steps:

a) Randomly choose a $w_B \times w_B$ texture patch $B_0$ from the input sample texture $I_{in}$. Paste $B_0$ in the lower left corner of $I_{out}$. Set k=1.

b) Form the set $\Psi_B$ of all texture patches from $I_{in}$ such that for each texture patch of $\Psi_B$, its boundary zone matches $E_{out}^k$.

c) If $\Psi_B$ is empty, set $\Psi_B = \{B_{min}\}$ where $B_{min}$ is chosen such that its boundary zone is closest to $E_{out}^k$.

d) Randomly select an element from $\Psi_B$ as the $k^{th}$ texture patch $B_k$. Paste $B_k$ onto the output texture $I_{out}$. Set k=k+1.

e) Repeat steps (b), (c), and (d) until $I_{out}$ is fully covered.

f) Perform blending in boundary zones.

The aforementioned blending step uses conventional feathering techniques to provide a smooth transition between adjacent texture patches after $I_{out}$ has been fully covered with texture patches. However, in a previously mentioned alternate embodiment, the blending operation is performed after each individual pasting operation.

2.4 Constrained Texture Synthesis:

Constrained texture synthesis differs from unconstrained texture synthesis in that in the case of constrained texture synthesis, the object is to either fill a hole or occlusion in a texture, or to synthesize a tileable output texture.

With respect to hole filling, the patch-based sampling and pasting system described above is easily adapted to fill holes or occlusions. In particular, rather than proceeding in a scan line type fashion for synthesizing the output texture as described above, the hole or occlusion is filled in a spiral order so as to better match features across patch boundary zones between the known texture around the hole or occlusion and the pasted texture patches. One simple example of an input texture to which a hole is artificially added, then filled using the system and method according to the present invention is provided by FIG. 5A through FIG. 5C.

In particular, FIG. 5A illustrates a 256 pixel by 256 pixel input sample texture. FIG. 5B illustrates the input sample texture of FIG. 5A, having a hole or occlusion of 128 pixel by 128 pixel hole in the center of the image. FIG. 5C illustrates the results the results of synthesizing an output texture with which to fill the hole illustrated in FIG. 5B. The hole is filled in spiral order, as noted above in order to provide the image of FIG. 5C. Note that as illustrated by FIG. 5C, there is no visible boundary or border between the original texture and the synthesized texture.

Tileable texture synthesis is another form of constrained texture synthesis. As is well known to those skilled in the art, a tileable texture is one in which the edges of the texture match when the texture is wrapped toroidally. Therefore, the only difference between synthesizing an unconstrained texture and synthesizing a tileable texture is that the synthesis of the tileable texture requires that more boundary zones are to be matched when populating the sets from which texture patches are chosen. In particular, texture patches at the beginning or end of a row, as well as all of the texture patches in the last row are chosen so that the boundary zones of the pasted texture patches match not only the adjacent texture patches, but those patches with which the pasted texture patch will contact when wrapped toroidally.

Figure 6A:
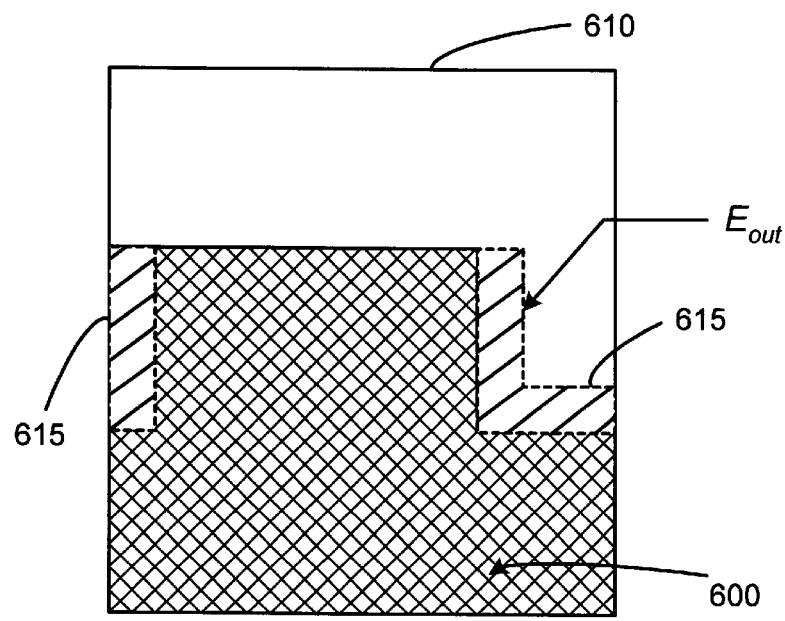
FIG. 6A illustrates exemplary boundary zones that are matched when pasting texture patches into a tileable output texture.
Figure 6B:
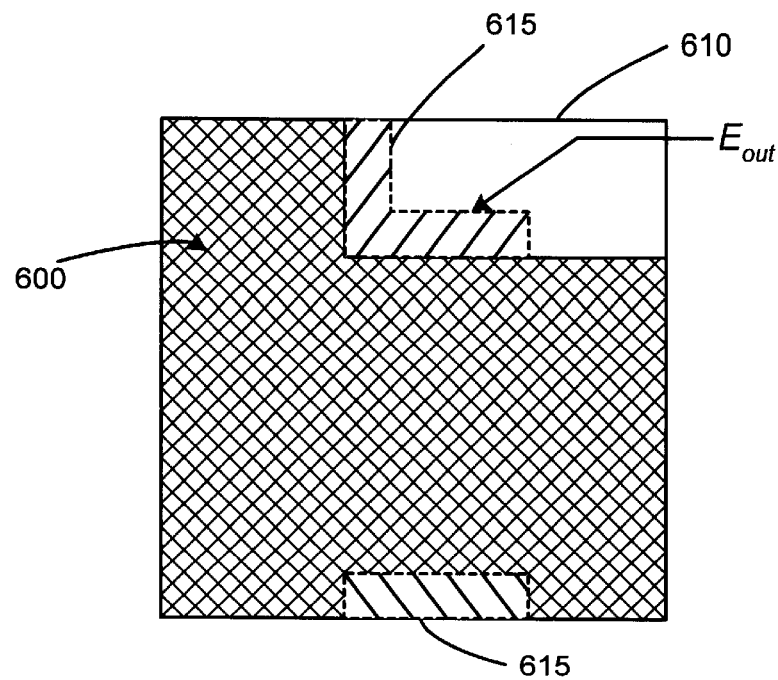
FIG. 6B illustrates exemplary boundary zones that are matched when pasting texture patches into a tileable output texture.

FIG. 6A and FIG. 6B illustrate the boundary zones to be matched for the last patch in a row and for the patches of the last row, respectively. In particular, the shaded area 600 of both FIG. 6A and FIG. 6B represents the portion of the output texture 610 which has already been synthesized. The hatched areas 615 of the two figures are the areas of already pasted patches, i.e., the boundary zones, $E_{out}$, to be matched by the boundary zones of the next texture patch to be pasted. Mathematically, in the synthesized texture $I_{out}$, the pixel values in the boundary zone are represented by Equation 3 as follows:

$$E_{out}(x,y) = I_{out}(x \bmod w_{out}, y \bmod h_{out}) \quad \text{Equation 3}$$

where (x, y) is the location of the pixel in $I_{out}$, and $w_{out}$ and $h_{out}$ are the width and height of the synthesized texture. Equation 3 defines the pixels in the boundary zone $E_{out}$ even if either $x > w_{out}$ or $y > h_{out}$ as illustrated by FIG. 6A and FIG. 6B.

Figure 7A:
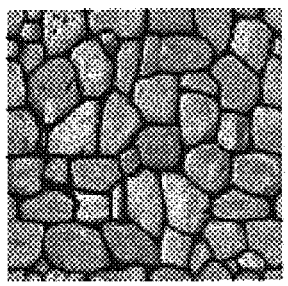
FIG. 7A illustrates an exemplary input image texture.
Figure 7B:
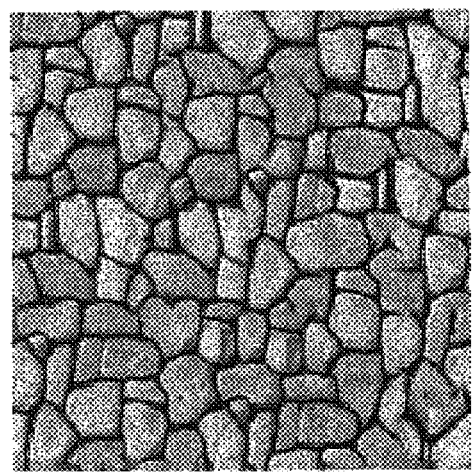
FIG. 7B illustrates a tileable output texture synthesized using the input image texture of FIG. 7B in accordance with the present invention.
Figure 7C:
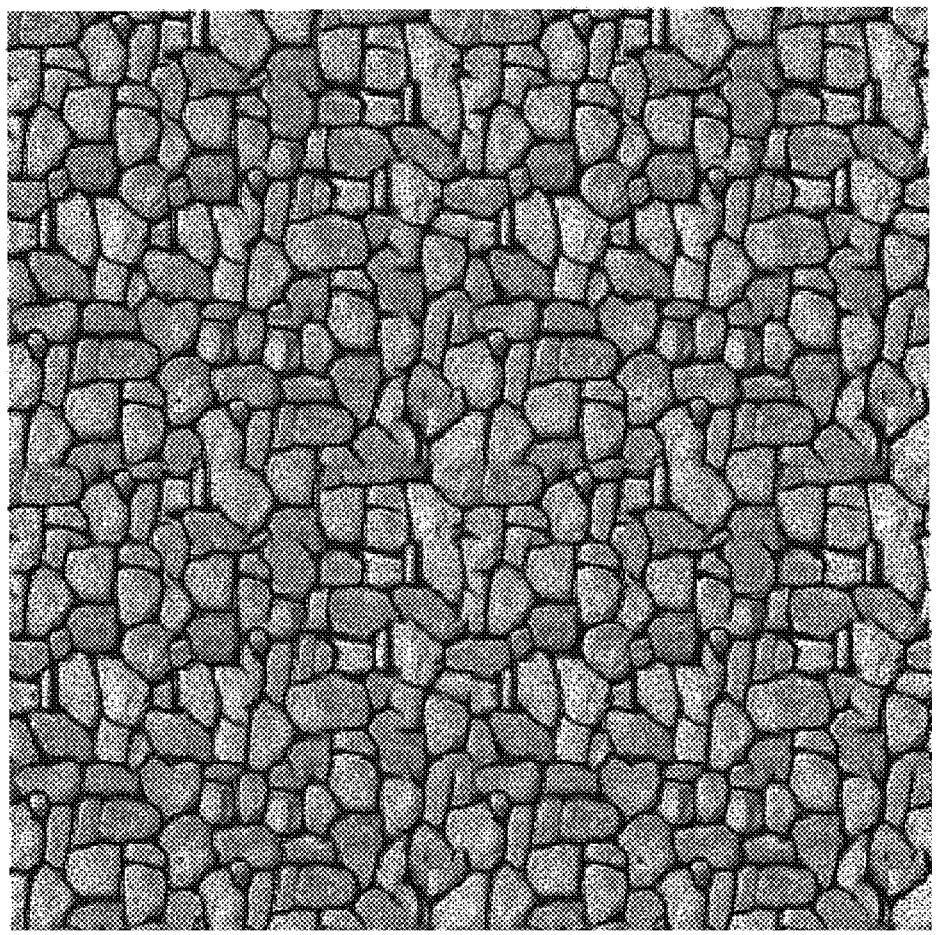
FIG. 7C illustrates a two-by-two tiling of the tileable output texture synthesized using the input texture image of FIG. 7B.

FIG. 7A and FIG. 7B shows a result of tileable texture synthesis (FIG. 7B) from an input sample texture (FIG. 7A). In this example, the image size of the output texture of FIG. 7B is clearly larger than the input sample texture of FIG. 7A. FIG. 7C illustrates a two-by-two tiling of the output texture of FIG. 7B. Note that the edges of the tileable synthesized output texture of FIG. 7B match when the image is tiled as illustrated by FIG. 7C.

3.0 Texture Patch Parameters:

As noted above, several parameters define each texture patch. In particular, a patch size, patch boundary zone width, and maximum distance between matching patch boundary zones must be either known or determined before patches are sampled for pasting into the output texture. These parameters are discussed in detail in the following sections.

3.1 Texture Patch Size:

The size, $w_B$, of the texture patch affects how well the synthesized texture captures the local characteristics of the input sample texture $I_{in}$. In general, a smaller $w_B$ allows more matching possibilities between texture patches and thus implies weaker statistical constraints and less similarity between the synthesized texture $I_{out}$ and the input sample texture $I_{in}$. Up to a certain limit, a larger $w_B$ implies better capturing of texture characteristics in the texture patches and thus more similarity between $I_{out}$ and $I_{in}$.

Figure 8A:
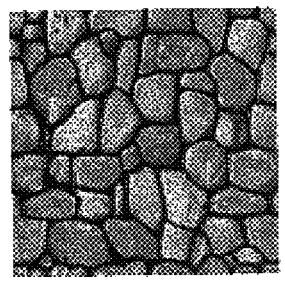
FIG. 8A illustrates an exemplary input image texture.
Figure 8B:
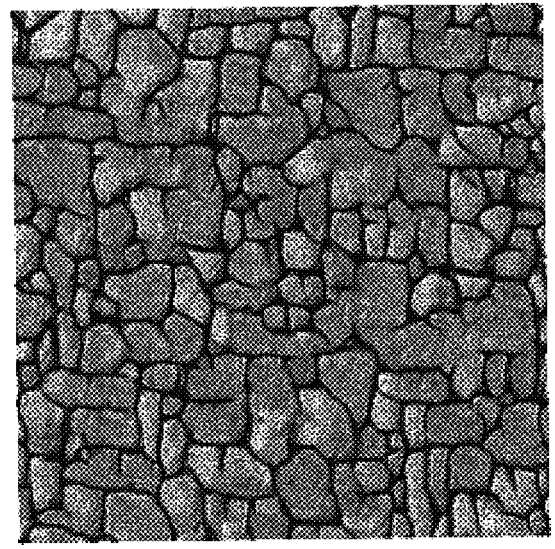
FIGS. 8B through 8D represent synthesized output textures that illustrate the effect of changing texture patch size in synthesizing an output texture from the input image texture of FIG. 8A.
Figure 8C:
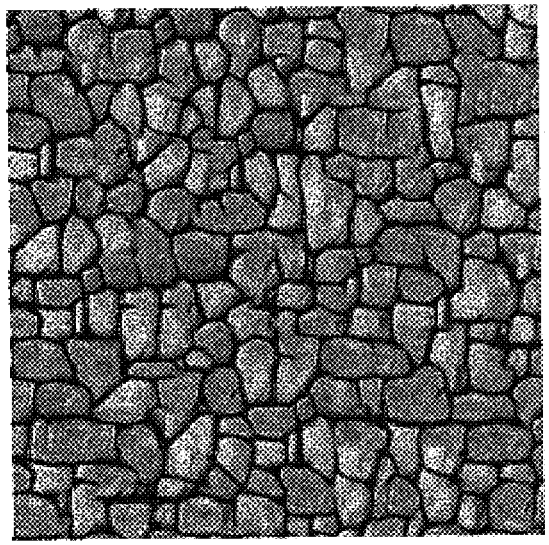
Figure 8D:
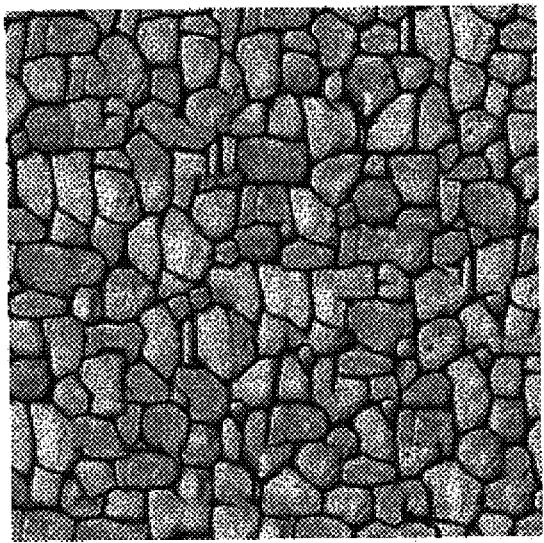

For example, FIG. 8A illustrates an input sample texture of size 64 by 64 pixels. FIG. 8B through FIG. 8D illustrates the effect of changing $w_B$ on the synthesized textures $I_{out}$. In particular, as illustrated by FIG. 8B, given the input sample texture of FIG. 8A, when $w_B=16$ pixels, the texture patches contain less structural information of the input sample texture $I_{in}$ (size 64 by 64 pixels). As a result, the synthesized textures $I_{out}$ of FIG. 8B appears more random than the input sample texture $I_{in}$. When the patch size, $w_B=24$, the synthesized texture $I_{out}$ becomes less random and more closely resembles the input sample texture of $I_{in}$, as illustrated by FIG. 8C. Finally, when the patch size, $w_B=32$, the synthesized texture $I_{out}$ become still less random and even more closely resembles the input sample texture of $I_{in}$, as illustrated by FIG. 8D.

Specifically, for an input sample texture of size $w_{in}$ by $h_{in}$, where $w_{in}$ and $h_{in}$ represent the width and the height of $I_{in}$, respectively, the patch size $w_B$ should be $w_B=\lambda\min(w_{in}, h_{in})$, where $0<\lambda<1$ is a "randomness parameter" according to the present invention. In a working example of the present invention, a $\lambda$ value between 0.25 and 0.50 was found to produce good results for texture synthesis. Note that the boundary zone width $w_E$ can also be used as a control parameter for the randomness of the synthesized texture. In general, $w_B$ should be a function of the scale of the texture elements in the input sample texture $I_{in}$. For texture synthesis, it is usually assumed that the approximate scale of the texture elements is known or otherwise specified by the user via the user interface, as noted above. However, in one embodiment, any of a number of well known conventional texture analysis techniques is used to find the scale of the texture elements from the given texture sample.

3.2 Texture Patch Boundary Zones:

A consideration of texture patch boundary zones includes not just the distance, i.e., the similarity, between texture patches, but the width of texture patch boundary zones, a distance tolerance for specifying a maximum acceptable distance, and handling of the edges of the input image texture when sampling texture patches. These considerations are discussed in detail in the following sections.

3.2.1 Boundary Zone Width ($w_E$):

In determining a proper width for texture patch boundary zones, better texture synthesis results are achieved by choosing a sufficiently large boundary zone width $w_E$ so as to avoid mismatching features across patch boundaries. A wide boundary zone implies strong statistical constraints, which force a natural transition of features across patch boundaries. However, when the boundary zone is too wide, the statistical constraint will become so strong that there will be very few texture patches satisfying the constraints in a small sample texture $I_{in}$. In that case, patch-based sampling suffers serious statistical fluctuations. Further, as discussed below, when $w_E$ is too large, it is also more costly to construct a k-d tree for accelerating the search for the texture patches of $\Psi_B$. In order to balance these issues, $w_E$ is typically set to be a small fraction, such as, for example, ⅙ of the patch size. Thus, for example, in a working example according to the present invention, a texture patch size of 24 pixels square was used, along with a texture boundary zone, $w_E$, of four pixels wide (⅙ of 24).

3.2.2 Distance Metric:

As noted above, any of a number of conventional techniques may be used for determining the distance between two boundary zones. One useful method for determining such distance in accordance with a system and method according to the present invention uses is by Equation 4, as follows:

$$d(E_{B_k}, E^k_{out}) = \left[\frac{1}{A}\sum_{i=1}^{A}(p^i_{B_k} - p^i_{out})^2\right]^{1/2} \quad \text{Equation 4}$$

where A is the number of pixels in the boundary zone. $P^i_{B_k}$ and $P^i_{out}$ represent the values (grey scale or color) of the i-th pixel in the boundary zones $E_{B_k}$ and $E^k_{out}$, respectively.

3.2.3 Distance Tolerance ($d_{max}$):

When the distance between two boundary zones is defined by Equation 4, as provided above, the maximum distance between two boundary zones, $d_{max}$, is provided by Equation 5, as follows:

$$d_{max} = \varepsilon\left[\frac{1}{A}\sum_{i=1}^{A}(p^i_{out})^2\right]^{1/2} \quad \text{Equation 5}$$

where A is the number of pixels in the boundary zone; $p^i_{out}$ represents the values (grey scale or color) of the i-th pixel in the boundary zone $E^k_{out}$; and $\varepsilon\geq 0$ is the relative matching error between boundary zones.

Figure 9A:
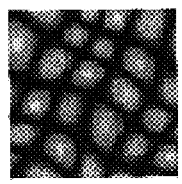
FIG. 9A illustrates an exemplary input image texture.
Figure 9B:
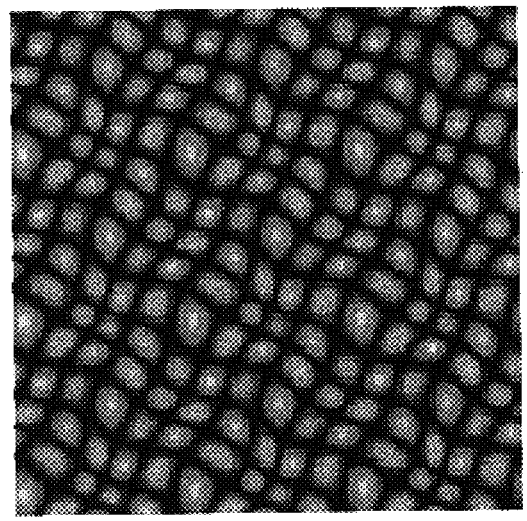
FIGS. 9B through 9D represent synthesized output textures that illustrate the effect of changing a relative matching error between boundary zones in synthesizing an output texture from the input image texture of FIG. 9A.
Figure 9C:
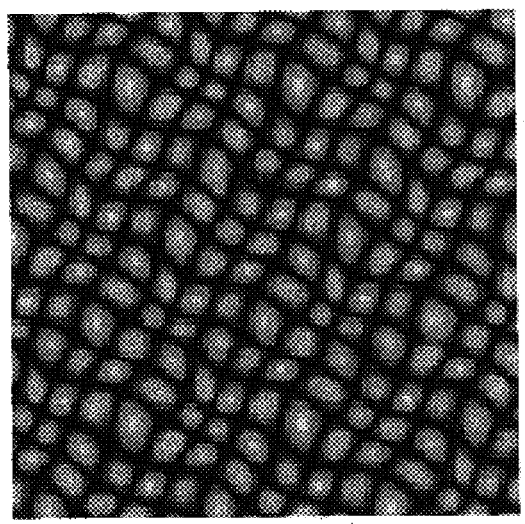
Figure 9D:
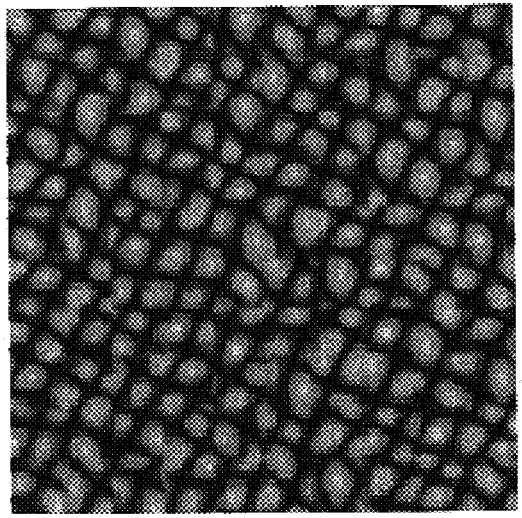

In general, the parameter $\varepsilon$ controls the similarity of the synthesized texture $I_{out}$ with the input sample texture $I_{in}$ and the quality of $I_{out}$. As the value of $\varepsilon$ decreases, the similarity of the local structures of the synthesized texture $I_{out}$ and the input sample texture $I_{in}$ increases. In the extreme, where $\varepsilon=0$, the synthesized texture $I_{out}$ simply looks like a tiling of the input sample texture $I_{in}$. Conversely, when $\varepsilon$ becomes too large, the boundary zones of adjacent texture patches may be very different and thus there may not be a natural transition across the patch boundaries. In a working embodiment of the present invention, the quality of the synthesized texture was ensured by setting $\varepsilon=0.2$. FIG. 9A through FIG. 9D illustrate the effect of different $\varepsilon$ values on texture synthesis. In particular, FIG. 9A provides an input texture sample, while FIG. 9B through FIG. 9D represent output textures synthesized using $\varepsilon$ values of 0, 0.2, and 1, respectively. Note that as illustrated by FIG. 9D, the randomness introduced into the synthesized output texture by the use of a large $\varepsilon$ produces a texture that begins to diverge substantially from the input sample texture in comparison to the synthesized textures of FIG. 9B and FIG. 9C.

3.2.4 Edge Handling:

When identifying potential texture patches within the input sample texture $I_{in}$, it is first necessary to specify whether $I_{in}$ is tileable. In particular, let $B_{(x,y)}$ be the texture patch whose lower left corner is at $(x, y)$ in $I_{in}$. To construct the set $\Psi_B$ we have to test $B_{(x,y)}$ for inclusion in $\Psi_B$. For $(x, y)$ near the border of the input sample texture $I_{in}$, part of $B_{(x,y)}$ may be outside of $I_{in}$. If the sample texture $I_{in}$ is tileable, then the value of $B_{(x,y)}$ is set toroidally. Specifically, $B_{(x,y)}(u, v) = I_{in}(u \bmod w_{in}, v \bmod h_{in})$ where $(u, v)$ is the location of a pixel of $B_{(x,y)}$ inside the sample texture $I_{in}$, and $w_{in}$ and $h_{in}$ are the width and the height of $I_{in}$, respectively. If the sample texture $I_{in}$ is not tileable, only those texture patches that are completely inside $I_{in}$ are searched for possible inclusion in $\Psi_B$.

4.0 Acceleration of Search for Matching Texture Patches:

As noted above, a set of matching texture patches, $\Psi_B$, as defined by Equation 2, is generated for each texture patch pasting operation. In general, it is necessary to search every possible texture patch in $I_{in}$ (keeping in mind the edge handing considerations discussed in Section 3.1.4) for texture patches whose boundary zones match $E^k_{out}$, i.e., the boundary zones of corresponding previously pasted texture patches. This search problem is typically rather time consuming. However, in accordance with the present invention, real-time texture synthesis is, in part, achieved by use of an acceleration system for searching and choosing patches to be pasted from the initial input image.

In general, the core computation in the patch-based sampling of the present invention can be formulated as a search for approximate nearest neighbors (ANN) to identify potentially matching texture patches. This search is accelerated to provide real-time texture synthesis by combining an optimized technique for a general ANN search with a novel data structure called the "quad-tree pyramid" for ANN search of images and principal component analysis of the input sample texture.

Real-time texture synthesis is achieved by acceleration of an ANN search for texture patches to fill the set from which patches are randomly selected. ANN searches are much faster, but less exact than brute force searching methods. However, conventional ANN searches are still too slow to allow for real-time texture synthesis using an average personal computer or the like. It is possible to accelerate an ANN search to provide for faster selection of matching texture patches. However, it is important to avoid acceleration techniques that will introduce noticeable artifacts in synthesized textures. With this principle in mind, the ANN search used by the present invention is accelerated at three levels that avoid the introduction of noticeable artifacts into the synthesized texture. Each of these three acceleration levels is used either individually, or in combination in alternate embodiments of the present invention.

In particular, a first level of acceleration of the ANN search is achieved using an optimized kd-tree. For patch-based sampling, this optimized kd-tree performs as well as a conventional bd-tree, which itself is optimal for ANN searching, but which introduces more artifacts into the synthesized texture than does the optimized kd-tree. Next, a second level of acceleration is introduced which utilizes the aforementioned quad-tree pyramid (QTP) to accelerate the ANN search by making use of the fact that the data points in the ANN search space are images. Finally, a conventional principal components analysis (PCA) is used to accelerate the search for texture patches within the given input sample texture.

4.1 Optimized kd-Tree:

As noted above, one of the three levels of search acceleration is provided by the use of an optimized kd-tree search. As kd-tree searches are well known to those skilled in the art, only a general overview of such searches is provided below.

As implemented in accordance with the present invention, a kd-tree partitions the data space of the input image texture into hypercubes using axis-orthogonal hyperplanes. Each node of a kd-tree corresponds to a hypercube enclosing a set of data points. When constructing a kd-tree, one important decision is to choose a splitting rule for breaking the tree nodes. In accordance with the present invention, the sliding mid-point rule is used. An alternative choice is the standard kd-tree splitting rule, which splits the dimension with the maximum spread of data points. The standard kd-tree splitting rule has a good guarantee on the height and size of the kd-tree. However, this rule produces hypercubes of arbitrarily high aspect ratio. Since is it preferred to allow only small errors in boundary zone matching, it is necessary to avoid high aspect ratios. The sliding mid-point rule can also lead to hypercubes of high aspect ratios, however, these hypercubes have a special property that prevents them from causing problems in nearest neighbor searching.

To search a kd-tree, an adaptation of conventional search algorithms is used. For implementation, a conventional Approximate Nearest Neighbor (ANN) library is used to build a kd-tree for each boundary zone configuration, i.e., for each configuration of edges that the texture patch needs to match, as discussed above.

4.2 Quad Tree Pyramid:

In general, the QTP accelerates the ANN search by providing the capability to perform hierarchical searches of image data to identify texture patches for populating the patch sets. As noted above, individual texture patches are then randomly chosen from these sets for each pasting operation. In general, the QTP provides a multilevel pyramid representation of the input image which the texture synthesis is to be based on. Unlike a conventional Gaussian pyramid, every set of four pixels in each lower level has a corresponding pixel in the next higher level. Note that each successively higher level of the QTP represents a successively lower resolution than each previous level. Successive levels of the QTP are generated by using any of a number of conventional filtering techniques to process the input image texture to generate successively lower resolution copies of the input image, with each lower resolution copy of the input image having a lower resolution than the previous level. Thus, each successive level, having successively lower resolution, has fewer data points, e.g., image pixels, which are searched to identify matching texture patches.

The QTP operates to accelerate ANN searches by finding approximate nearest neighbors (ANN's) for a given query vector v from the highest level, lowest resolution level down to the lowest level, original input image texture. First, m initial candidates, i.e., m potential texture patch matches, are identified at the highest level of the pyramid using the low resolution data points (image pixels) and the query vector v. In general, an m much smaller than n is chosen, with n representing the number of data points. In a working example of the present invention, an m=40 was used. Increasing m tends to increase the total number of nearest neighbors eventually identified, but it also serves to increase the time necessary for conducting searches. From the initial candidates, the k nearest neighbors are identified by following the high-resolution query vector v down through progressively lower levels of the pyramid to the base level, i.e., the original input image texture.

In order to accelerate the search of the m initial candidates, the input sample texture is simply filtered, such as, for example, by downsampling the image, into one or more successively lower resolution copies of the input image. A tree pyramid is then built using the successively lower resolution images. The tree node in the QTP is a pointer to an image patch and each tree level corresponds to a level in the pyramid, with the root of the tree being the initial input sample texture. When moving from one level of pyramid to the next lower resolution level, four children (lower resolution images) are computed, with different shifts along the x- and y-axis (i.e., up, down, left, right) for each child to ensure that each pixel or patch in a given child corresponds to a patch in the next lower level (higher resolution) child of the input image. As noted above, this shift ensures that, unlike a conventional Gaussian pyramid, each pixel in a given child has four corresponding pixels in the next higher resolution image, e.g., the filtered image on the next lower level of the pyramid.

Figure 10:
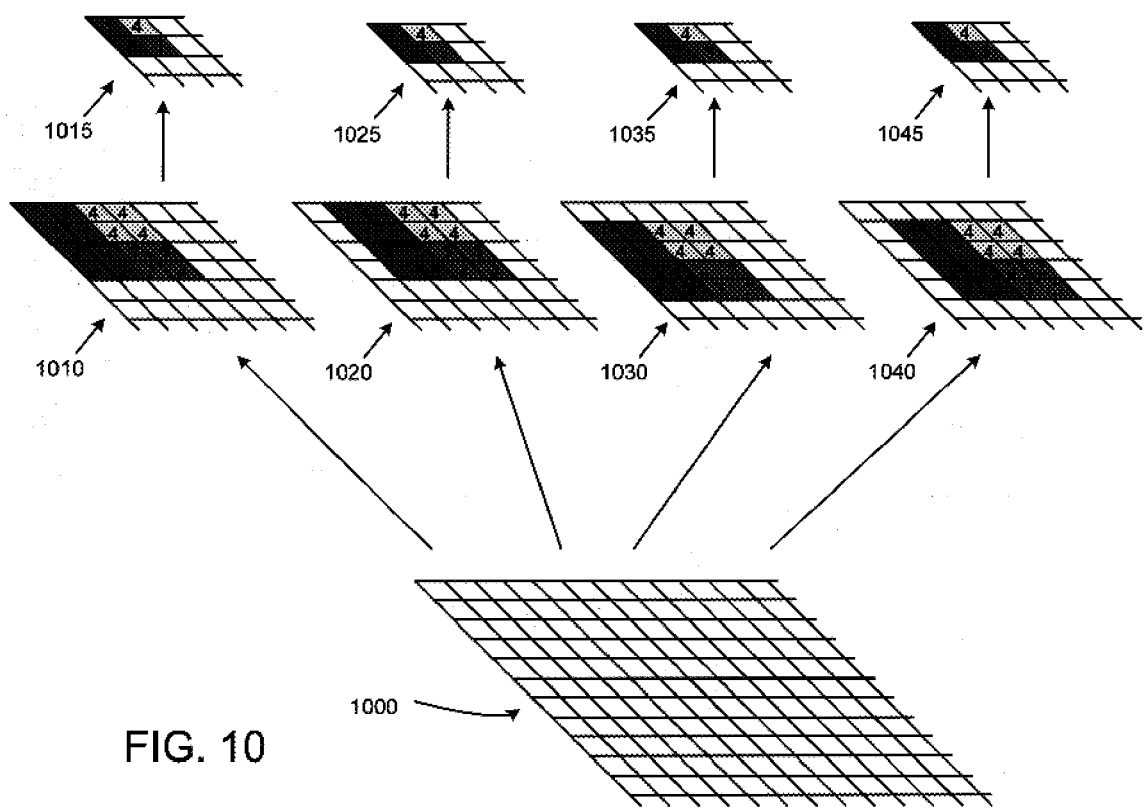
FIG. 10 illustrates a graphical representation of a two level quad-tree pyramid (QTP) for searching for matching texture patch candidates in accordance with the present invention

This concept is best illustrated with reference to FIG. 10 which shows a graphical representation of a two level QTP according to the present invention. In particular, the lowest level 1000 of the QTP represents the original input image texture. From this original input image texture, four copies of the texture are created by shifting the image a one-pixel distance in each of the four possible directions from a given starting point as illustrated by the first level of the QTP, i.e., 1010, 1020, 1030, and 1040. Next, each of the four shifted textures is filtered to provide a lower resolution copy for the next higher level of the QTP, for example, the texture patch illustrated by element 1015 is a lower resolution copy of the texture patch illustrated by element by 1010. Similarly, the texture patch illustrated by element 1025 is a lower resolution copy of the texture patch illustrated by element by 1020.

Given this basis for the QTP, once the initial texture patch has been pasted into the output texture, it is filtered to the same resolution as the highest level of the QTP. The highest level of the QTP is then searched to identify potential matches, as noted above. Potential matches are then followed back down each branch of the QTP to the base of the QTP where the distance is computed based on unfiltered copies of the previously pasted texture patch and the potential matching texture patch. If the distance is less than the maximum distance, the boundary zones are said to match, as discussed above.

In other words, initial candidates are selected by first comparing filtered image patches at the highest level of the QTP to a filtered copy of the previously pasted texture patch. Note that multiple boundary zones may need to be matched depending on where the next patch is to be pasted, and whether the output texture is to be tileable. Potential matches are then followed down through the tree to identify actual texture patch matches to the previously pasted texture patch. The k ANN texture patches are identified by following the pyramid down to the root of the QTP and computing the distance of potential texture patch matches to see if they actually match the previously pasted texture patch or patches. Consequently, the total number of potential searches is dramatically reduced with each successively higher level of the QTP because there are so many fewer data points as the number of levels of the QTP increases. This dramatic reduction in the number of potential searches serves to drastically reduce the time necessary to identify texture patch matches for pasting into the synthesized texture, thereby facilitating real-time texture synthesis.

It should be noted, that in the extreme, as the number of levels of the QTP are increased, the reduced resolution of the higher levels will cause more and more potential texture patch matches to be missed. In a working example of the present invention, it was found that a three level QTP produced very good results while drastically reducing search time for identifying texture patch matches for pasting into the synthesized texture in comparison to other conventional patch-based texture synthesis schemes.

Figure 4D:
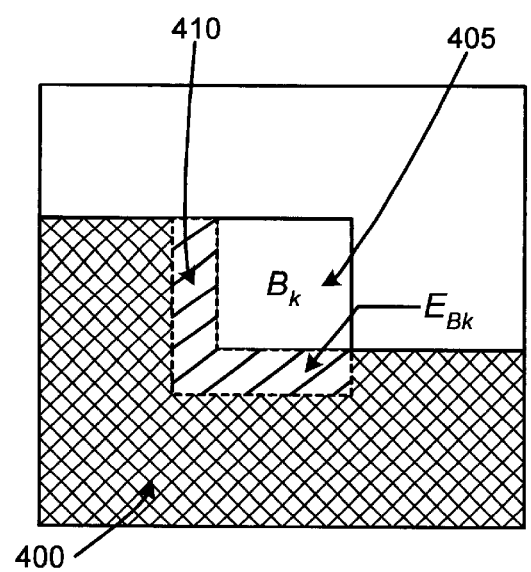
FIG. 4D illustrates sequential pasting of texture patches into the output texture of FIG. 4C.

4.3 Principal Components Analysis:

The approximate nearest neighbors search can be further accelerated by considering a special property of the input sample texture. Specifically, the dimension of the search space is reduced using a conventional principal components analysis (PCA). Specifically, assume that a kd-tree is to be built, the kd-tree containing n data points $\{x_1, \ldots, x_n\}$ where each $x_i$ is a d-dimensional vector. Conventional PCA finds the eigenvalues and eigenvectors of the covariance matrix of these data points. The eigenvectors of the largest eigenvalues span a subspace containing the main variations of the data distribution. The data points $\{x_1, \ldots, x_n\}$ are projected into this subspace as $\{x'_1, \ldots x'_n\}$, where each $x'_i$ is a d'-dimensional vector with d'<<d. The subspace dimension d' is chosen so that 97% of the variation the original data is retained. For example, where the texture patch size is $w_B=64$ and the boundary zone width is $w_E=4$, an analysis of the data at the top level of a three-level pyramid for the "L"-shaped boundary zone in FIG. 4D, shows that the dimension of data points is $d=3\times(16+15)=93$ dimensions. PCA typically reduces the dimension to about d=20, thereby significantly reducing search time.

4.4 Combined Search Acceleration:

As noted above, each of the individual levels of acceleration discussed in detail below are combined in alternate embodiments to produce a compounded acceleration of the ANN search. Specifically, three alternate acceleration embodiments are used in accordance with the present invention. These embodiments include:1) QTP search acceleration; 2) QTP with kd-tree search acceleration; and 3) QTP with both kd-tree and PCA search acceleration. It should be appreciated by those skilled in the art, that in further alternate embodiments of the present invention, other conventional acceleration methods may be combined with the QTP acceleration for further reducing the search time required to identify matching texture patches.

In particular, the "QTP" method uses QTP to filter all data points into low resolution. Then, an exhaustive search is invoked for finding the initial candidates in low resolution and for choosing the ANN's from the initial candidates in high resolution. The combined QTP plus kd-tree method is similar to the "QTP" method; the only difference is that a kd-tree is built when searching for the initial candidates among the low resolution data points. Finally, the combined QTP plus kd-tree plus PCA method further accelerates the aforementioned QTP plus kd-tree method by projecting all low resolution data points into a low dimensional subspace when searching for the initial candidates using a kd-tree.

5.0 Working Example:

In a working example of the present invention, the program modules described in Section 2.1 with reference to FIG. 2 are employed to automatically synthesize one or more textures from an input sample. This process is depicted in the flow diagram of FIG. 11. It should be noted that the boxes and interconnections between boxes that are represented by broken or dashed lines in FIG. 11 represent alternate embodiments of the present invention, and that any or all of these alternate embodiments, as described below, may be used in combination with other alternate embodiments that are described through this document.

Figure 11:
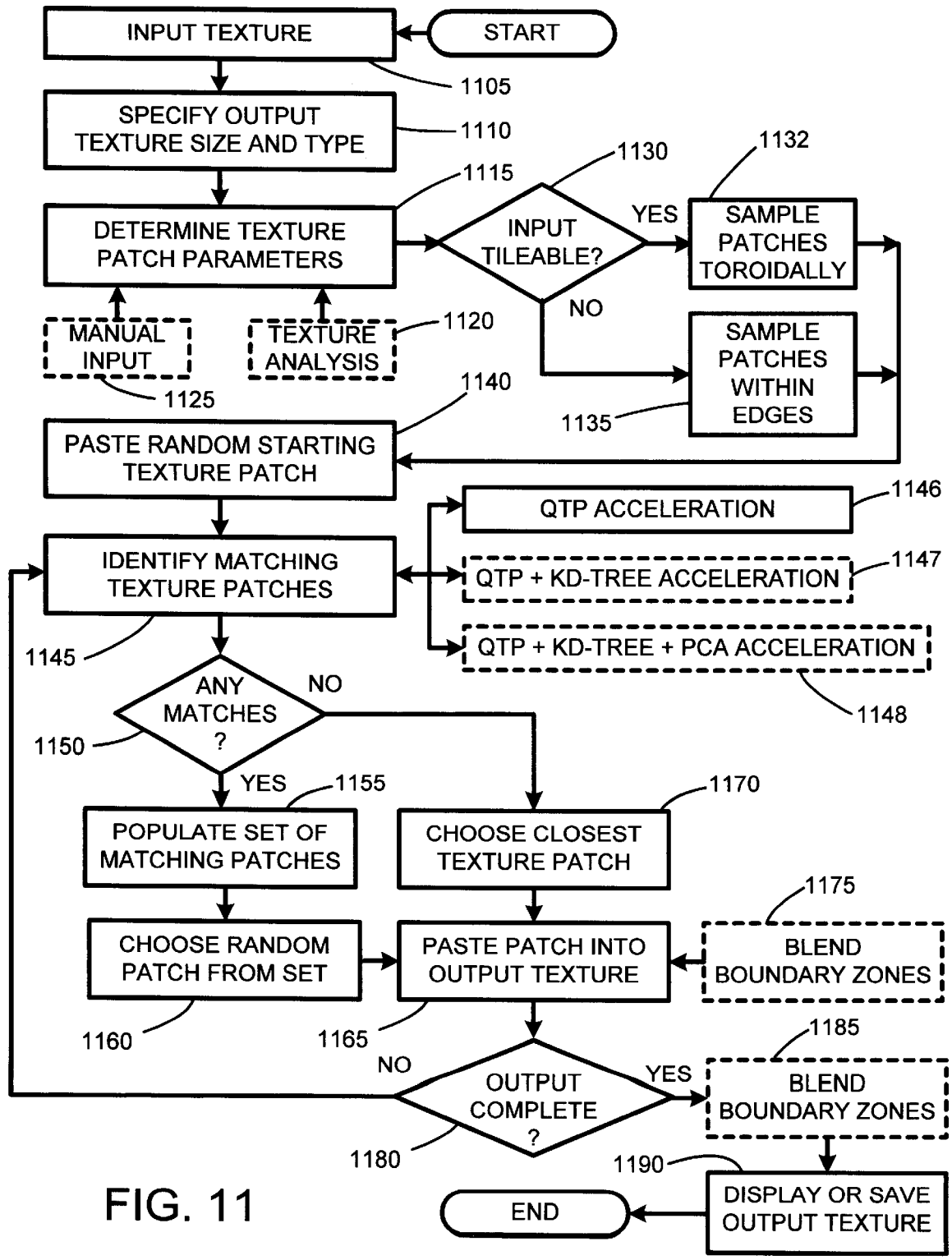
FIG. 11 illustrates an exemplary system flow diagram for implementing a working example according to the present invention.
Figure 12:
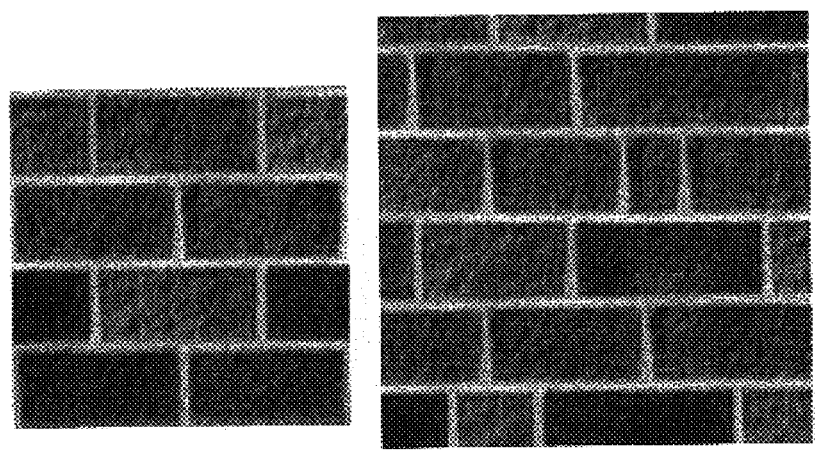
FIG. 12 illustrates an exemplary input image texture on the left, paired with an output texture on the right synthesized from the input image texture in a working example of the present invention.

Referring now to FIG. 11 in combination with FIG. 2, the process is started by first inputting an input image texture 1105. The input image texture is retrieved via conventional means from any of an electronic file, image database, digital camera, scanner, or any other digital image capture or storage device. Once the input image texture has been inputted into the system, the desired output texture size must be specified 1110. Note that in the case where an occlusion is to be filled, the location of the occlusion is either specified manually by the user, or in one embodiment, the area of the occlusion is located automatically using conventional image analysis techniques.

Next, the parameters defining the texture patches that will be used to synthesize the output texture are determined 1115. As noted above, these parameters include patch size, patch boundary zone width, and maximum distance between matching patch boundary zones. Further, as discussed above, both patch size and distance act to define the amount of randomness exhibited by the output texture. In one embodiment, the texture patch parameters are determined automatically 1120, as discussed above. In another embodiment, the texture patch parameters are entered manually 1125.

Once the input image texture has been received 1105, the output texture size specified, and the patch parameters determined 1115, the next step is to simply specify whether the input image texture is tileable or not 1130. If the input image texture is tileable, then sampling of texture patches will, in some cases naturally overlap the input image texture boundaries, and wrap to the opposite sides of the input image texture. In other words, assuming a tileable input image texture, then the texture patches will be sampled toroidally 1132. However, if the input image texture is not tileable, then the texture patches are instead only sampled from completely within the boundaries of the input image texture 1135.

To begin actual synthesis of the texture patch, a random patch is sampled and pasted into the output texture 1140. The next step is to identify those texture patches 1145 which have boundary zones matching any overlapping areas where the texture patch will be pasted. Towards that end, an accelerated search is performed to identify matching texture patches. Specifically, a QTP search 1146 is performed to identify matching texture patches. In one alternate embodiment, as discussed above, a kd-tree search is added to the QTP search 1147 to further accelerate the search for matching texture patches. In still another embodiment, a PCA search is added to the combined QTP plus kd-tree search 1148 to further accelerate the search for matching texture patches.

If any matches are identified 1150, then they are used to populate a set of possible texture patches 1155 from which a patch is randomly chosen 1160 for pasting into the output texture 1165. However, in the case where the aforementioned accelerated searches are unable to identify any matching texture patches, then the particular texture having the closest match 1170 to any boundary zones where the patch is to be pasted is chosen and pasted into the output texture 1165.

In one embodiment, after each patch pasting operation 1165, overlapping patch boundary zones are blended 1175 using conventional feathering techniques. However, in another embodiment, the blending of overlapping boundary zones 1185 is not performed until a determination has been made that the output texture has been completely synthesized 1180. Once the output texture synthesis is complete 1180, the synthesized output texture is provided for display on a computer display device, or saved to computer readable media 1190 for latter use. If the synthesis of the output texture is not complete, then another set of matching texture patches is populated 1145 and 1155, and a random patch is chosen 1160 from the set for pasting 1165 as described above. Again, if the set is empty, then a patch having the closest match is instead identified 1170 and pasted 1165 into the output texture as described above. These steps simply repeat, as illustrated by FIG. 11, until the output texture is complete.

Figure 13:
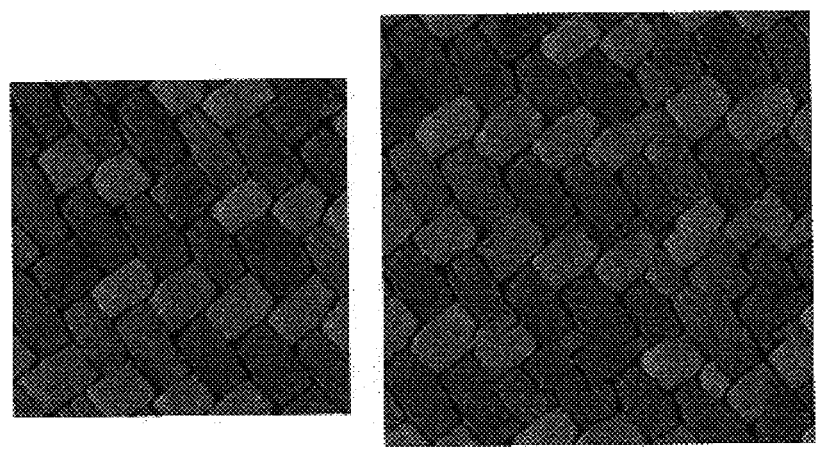
FIG. 13 illustrates an exemplary input image texture on the left, paired with an output texture on the right synthesized from the input image texture in a working example of the present invention.
Figure 14:
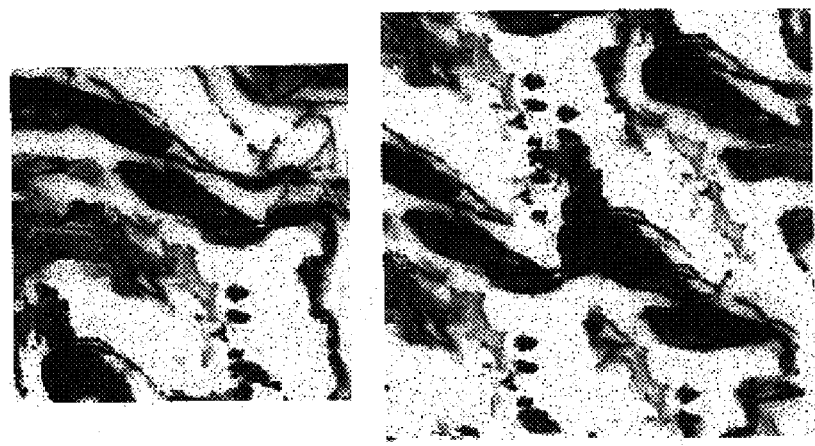
FIG. 14 illustrates an exemplary input image texture on the left, paired with an output texture on the right synthesized from the input image texture in a working example of the present invention.
Figure 15:
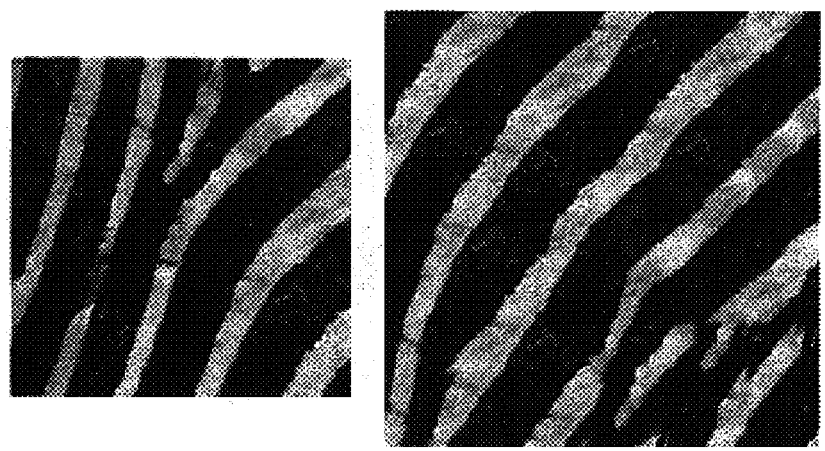
FIG. 15 illustrates an exemplary input image texture on the left, paired with an output texture on the right synthesized from the input image texture in a working example of the present invention.
Figure 16:
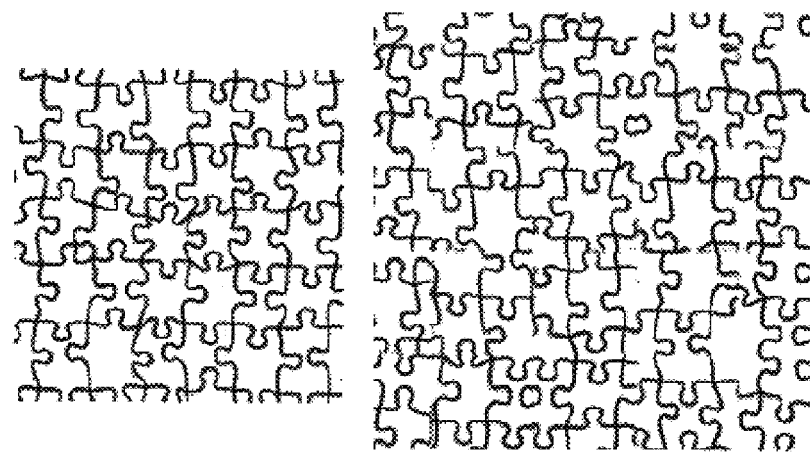
FIG. 16 illustrates an exemplary input image texture on the left, paired with an output texture on the right synthesized from the input image texture in a working example of the present invention.
Figure 17:
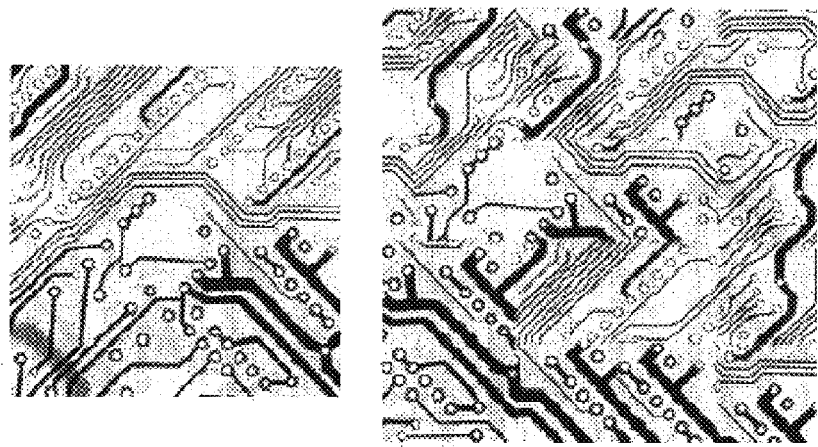
FIG. 17 illustrates an exemplary input image texture on the left, paired with an output texture on the right synthesized from the input image texture in a working example of the present invention.
Figure 18:
FIG. 18 illustrates an exemplary input image texture on the left, paired with an output texture on the right synthesized from the input image texture in a working example of the present invention.
Figure 19:
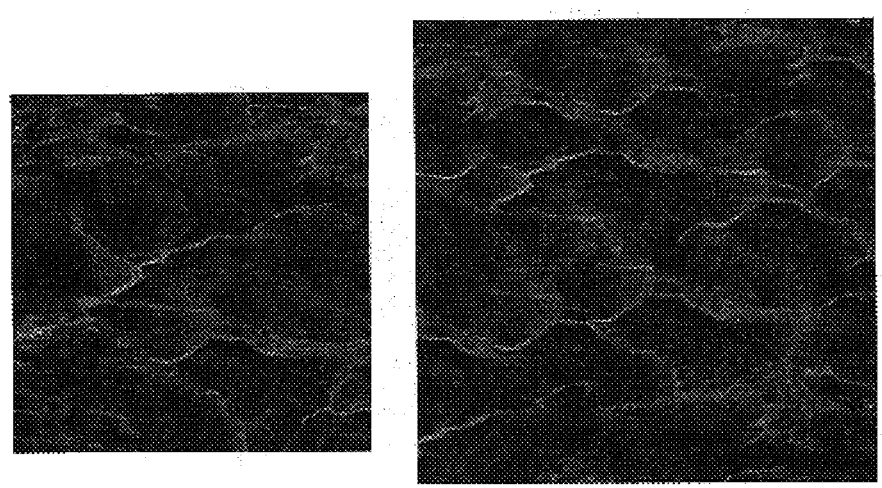
FIG. 19 illustrates an exemplary input image texture on the left, paired with an output texture on the right synthesized from the input image texture in a working example of the present invention.

5.1 Sample Texture Synthesis Results:

FIGS. 13 through 19 represent pairs of input sample textures along with output textures synthesized from texture patches sampled from the input sample textures in accordance with the present invention. In each of these figures, the input sample texture is on the left, and the synthesized texture is on the right. Note the wide range of texture types, ranging from regular to stochastic, that are realistically generated by a system and method according to the present invention. The size of each of the input texture samples represented by FIGS. 13 through 19 was 200 by 200 pixels, while the size of each of the output textures was 256 by 256 pixels. The average synthesis time for each the output textures represented by FIGS. 13 through 19 is approximately 0.02 seconds on a 667 MHz personal computer. Note that FIG. 13 is an example of a regular texture, while FIG. 14 is an example of a stochastic texture.

Figure 20:
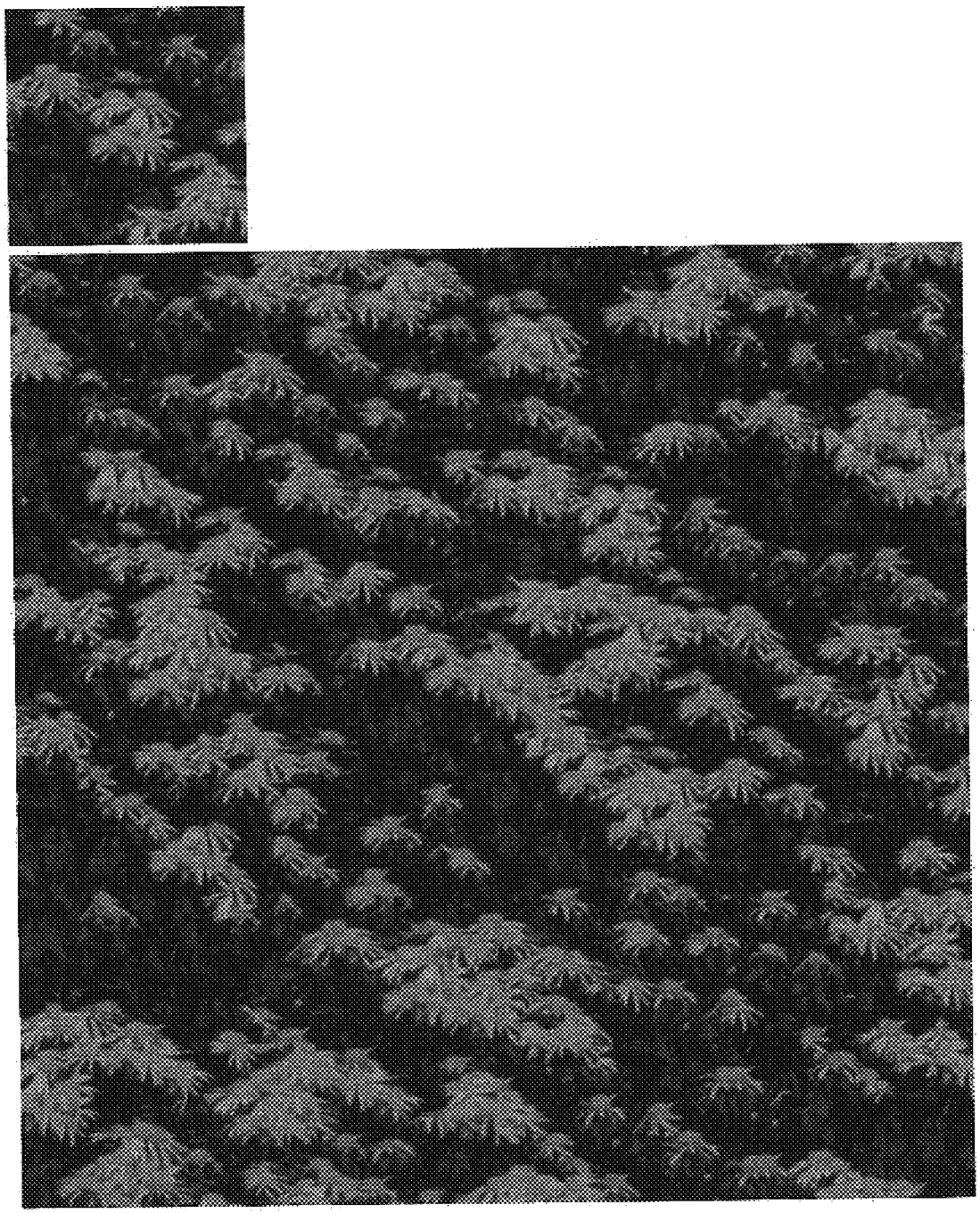
FIG. 20 illustrates an exemplary input image texture on the top, paired with a relatively large output texture on the bottom synthesized from the input image texture in a working example of the present invention.

FIG. 20 represents another pair of an input sample texture along with an output texture synthesized from texture patches sampled from the input sample texture in accordance with the present invention. The input sample texture is provided as the small upper rectangular image area, while the synthesized texture is provided as the larger lower image area. Note that the synthesized texture can be substantially larger than the input sample texture without appearing either to be tiled, or to have noticeable visible image artifacts. In particular, the synthesized image of FIG. 20 is 800 by 800 pixels in size, while the input image texture is only 200 by 200 pixels in size. The total synthesis time for the output texture of FIG. 20 was approximately 0.65 seconds on a 667 MHz personal computer.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for automatically synthesizing image textures from an input image texture comprising:
   randomly selecting an initial texture patch from an input image texture;
   pasting the initial texture patch into an output texture;
   populating a set of texture patches from the input image texture, wherein the set is comprised of texture patches sampled from the input image texture, and wherein the set is populated with texture patches having boundary zones matching overlapping regions of the output texture where a next patch will be pasted;
   randomly selecting a texture patch from the set of texture patches;
   pasting the randomly selected texture patch into the output image;
   continuing to generate a new set of matching texture patches sampled from the input image texture and randomly selecting and pasting one patch from each new set of matching texture patches until the output texture is filled with texture patches.

2. The system of claim 1 wherein generating new sets of texture patches comprises searching through all possible texture patches within the input image to identify texture patches having boundary zones that match areas overlapping at least one region within the output texture within which a texture patch from the set will be pasted.

3. The system of claim 2 wherein the search for texture patches is accelerated by searching at least one filtered version of the input image texture to identify potential texture patch matches, and wherein matching texture patches are identified by comparing unfiltered texture patches corresponding to the potential texture patch matches of the filtered input image texture to areas overlapping at least one region within the output texture within which a texture patch from the set will be pasted.

4. The system of claim 2 wherein the search for texture patches is accelerated by using a quad-tree pyramid to identify potential texture patch matches at a low level of resolution, and wherein potential texture patch matches at the low level of resolution correspond to texture patches sampled from the input image texture at an original resolution of the input image texture.

5. The system of claim 1 wherein overlapping regions of texture patches within the output texture are blended after each texture patch is pasted into the output texture.

6. The system of claim 1 wherein overlapping regions of texture patches within the output texture are blended after the output texture is filled with texture patches.

7. The system of claim 4 wherein the quad-tree pyramid search for texture patch matches is further accelerated by combining the quad-tree pyramid search with a kd-tree search.

8. The system of claim 7 wherein the combined quad-tree pyramid and kd-tree search is further accelerated by combining the combined search with a principal components analysis.

9. The system of claim 1 wherein a size of the output texture is user definable.

10. The system of claim 1 wherein pasting of texture patches within the output image proceeds row-by-row in a scanline fashion until the output texture is filled with texture patches.

11. The system of claim 1 wherein pasting of texture patches within the output image proceeds in a spiral order to fill at least one occlusion within the input image texture until the occlusion is filled with texture patches.

12. The system of claim 1 wherein the input image texture is tileable.

13. The system of claim 12 wherein sampling of texture patches from the input image texture comprises toroidally sampling the input image texture.

14. The system of claim 1 wherein the output texture is tileable.

15. The system of claim 14 wherein texture patches pasted into the output texture are toroidally matched within the output texture.

16. A computer-implemented process for synthesizing image textures in real-time, comprising:

determining an approximate scale of texture elements within an input texture;

defining texture patch parameters as a function of the scale of texture elements within the input texture;

using the texture patch parameters to define a texture patch size;

randomly sampling a texture patch of the defined size from an input texture and pasting the randomly sampled texture patch into an output texture;

searching within the input texture to identify a set of texture patches having boundary zones matching overlapping regions of the output texture where a next patch will be pasted;

pasting a texture patch into the output image, wherein the pasted texture patch is randomly selected from the set of texture patches;

continuing to perform new searches of the input texture to identify new sets of texture patches, and randomly selecting and pasting one patch from each new set until the output texture is filled with texture patches.

17. The computer-implemented process of claim 16 wherein the texture patch parameters include a texture patch size, a texture patch boundary zone width, and a maximum allowable distance between matching overlapping regions.

18. The computer-implemented process of claim 16 wherein searching within the input texture to identify a set of texture patches is accelerated by using a quad-tree pyramid search to identify potential texture patch matches.

19. The computer-implemented process of claim 18 wherein the quad-tree pyramid search for texture patch matches is further accelerated by combining the quad-tree pyramid search with a kd-tree search.

20. The computer-implemented process of claim 19 wherein the combined quad-tree pyramid and kd-tree search is further accelerated by combining the combined search with a principal components analysis.

21. The computer-implemented process of claim 16 wherein overlapping regions of texture patches within the output texture are blended after each texture patch is pasted into the output texture.

22. The computer-implemented process of claim 16 wherein overlapping regions of texture patches within the output texture are blended after the output texture is filled with texture patches.

23. The computer-implemented process of claim 16 wherein a texture patch having a closest match to overlapping regions of the output texture where a next patch will be pasted is chosen and pasted into the output texture where the searching within the input texture fails to populate the set of texture patches.

24. A computer-readable medium having computer executable instructions for automatically synthesizing an output image texture from an input image texture, said computer executable instructions comprising:

pasting an initial randomly sampled texture patch from an input texture into an output texture;

using a quad-tree pyramid for searching within the input texture to identify a set of texture patches having boundary zones matching overlapping regions of the output texture corresponding to a location where a next texture patch will be pasted;

pasting the next texture patch into the output image, wherein the next texture patch is randomly selected from the set of texture patches;

continuing to perform new quad-tree pyramid searches of the input texture to identify new sets of texture patches having boundary zones matching overlapping regions of the output texture, and randomly selecting and pasting one patch from each new set into the output texture until the output texture is filled with texture patches.

25. The computer-readable medium of claim 24 wherein the quad-tree pyramid search for texture patches is accelerated by combining the quad-tree pyramid search with a kd-tree search.

26. The computer-readable medium of claim 25 wherein the combined quad-tree pyramid and kd-tree search is further accelerated by combining the combined search with a principal components analysis.

27. The computer-readable medium of claim 24 wherein pasting one patch from each new set into the output texture comprises pasting each patch in rows in a scanline fashion until the output texture is filled with texture patches.

28. The computer-readable medium of claim 24 wherein pasting one patch from each new set into the output texture comprises pasting each patch in a spiral order beginning from an outer edge of the output texture, and proceeding into the interior of the output texture until the output texture is filled with texture patches.

29. The computer-readable medium of claim 28 wherein spiral pasting of texture patches is used for filling occlusions in the output image.

30. The computer-readable medium of claim 24 wherein the input image is tileable, and wherein searches of the input texture to identify new sets of texture patches comprises toroidally sampling the input image texture to identify texture patches having boundary zones matching overlapping regions of the output texture.

31. The computer-readable medium of claim 24 wherein the output texture is tileable, and wherein texture patches pasted into the output texture are toroidally matched with overlapping boundary zones of the output texture.

32. The computer-readable medium of claim 24 wherein any overlapping boundary zones of texture patches in the output texture are blended after each texture patch is pasted into the output texture.

33. The computer-readable medium of claim 24 wherein any overlapping boundary zones of texture patches in the output texture are blended after the output texture is filled with texture patches.

34. The computer-readable medium of claim 24 wherein each texture patch has a predetermined size and boundary zone width.

35. The computer-readable medium of claim 24 wherein each texture has a user definable size and boundary zone width.

36. The computer-readable medium of claim 24 wherein searching the input texture to identify new sets of texture patches having boundary zones matching overlapping regions of the output texture the texture patches comprises identifying texture patches that do not exceed a minimum distance from overlapping regions of the output texture.

* * * * *